US012501487B2

(12) United States Patent
Wu

(10) Patent No.: US 12,501,487 B2
(45) Date of Patent: Dec. 16, 2025

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Zuomin Wu, Guangdong (CN)

(73) Assignee: GUANGDONG OPPO TELECOMMUNICATIONS CORP., LTD., Guangdong (CN)

( * ) Notice: Subject to any disclaimer, the term of this patent is extended or adjusted under 35 U.S.C. 154(b) by 391 days.

(21) Appl. No.: 18/087,085

(22) Filed: Dec. 22, 2022

(65) Prior Publication Data

US 2023/0130803 A1 Apr. 27, 2023

Related U.S. Application Data

(63) Continuation of application No. PCT/CN2020/107999, filed on Aug. 7, 2020.

(51) Int. Cl.
*H04W 74/0816* (2024.01)
*H04W 74/08* (2024.01)
(52) U.S. Cl.
CPC ... *H04W 74/0816* (2013.01); *H04W 74/0866* (2013.01)
(58) Field of Classification Search
CPC .............. H04W 74/0816; H04W 74/0866
See application file for complete search history.

(56) References Cited

U.S. PATENT DOCUMENTS

2017/0318607 A1  11/2017 Tiirola et al.
2017/0339717 A1  11/2017 Futaki
2018/0199369 A1*  7/2018 Larsson ............... H04W 72/23
2020/0037354 A1*  1/2020 Li ..................... H04W 74/0808

FOREIGN PATENT DOCUMENTS

CN  105592468 A  5/2016
CN  105611540 A  5/2016
(Continued)

OTHER PUBLICATIONS

The first examination report of corresponding European application No. 20948066.4, dated Dec. 4, 2024.
(Continued)

*Primary Examiner* — James P Duffy
(74) *Attorney, Agent, or Firm* — Ladas & Parry LLP

(57) ABSTRACT

Embodiments of the present application provide a wireless communication method, a terminal device, and a network device, where a COT initiated by the network device and a COT initiated by the terminal device can reasonably coexist on an unlicensed spectrum. The wireless communication method includes: the terminal device determining a first periodic channel occupancy, the first periodic channel occupancy being a channel occupancy for the terminal device to perform initiation, the first periodic channel occupancy including a first channel occupancy; the terminal device initiating the first channel occupancy, or, the terminal device determining whether to initiate the first channel occupancy.

13 Claims, 9 Drawing Sheets

(56) References Cited

FOREIGN PATENT DOCUMENTS

| CN | 110100399 A | 8/2019 |
|---|---|---|
| CN | 111132321 A | 5/2020 |

OTHER PUBLICATIONS

The EESR of corresponding European application No. 20948066.4, dated Jun. 19, 2023.
International Search Report (ISR) dated Apr. 29, 2021 for Application No. PCT/CN2020/107999.
Written Opinion (WOSA) dated Apr. 29, 2021 for Application No. PCT/CN2020/107999.
Zte et al. "Remaining issues on channel access procedure for NR-U", R1-1911822, 3GPP TSG RAN WG1 Meeting #99, Nov. 18-22, 2019.
Nokia et al."Revised WID: Enhanced Industrial Internet of Things (IoT) and ultra-reliable and low latency communication (URLLC) support for NR", RP-201310, 3GPP TSG RAN Meeting #88e, Jun. 29-Jul. 3, 2020.

* cited by examiner

WIRELESS COMMUNICATION METHOD, TERMINAL DEVICE AND NETWORK DEVICE

CROSS-REFERENCE TO RELATED APPLICATION

This application is a continuation of International Application No. PCT/CN2020/107999, filed on Aug. 7, 2020, which is hereby incorporated by reference in its entirety.

TECHNICAL FIELD

Embodiments of the present application relate to the field of communications and, more specifically, to a wireless communication method, a terminal device and a network device.

BACKGROUND

In a New Radio-based access to unlicensed spectrum (NR-U) system, the spectrum used is a shared spectrum. In a communication system that is deployed on the shared spectrum, such as an NR-U system, a frame based equipment (FBE) mode has been introduced to support a channel occupancy time (COT) initiated by a terminal device. However, in such a situation, how to carry out signal/channel transmission to ensure the reasonable coexistence of a COT initiated by a network device and the COT initiated by the terminal device on the unlicensed spectrum is an urgent issue to be solved.

SUMMARY

Embodiments of the present application provide a wireless communication method, a terminal device, and a network device, where a COT initiated by the network device and a COT initiated by the terminal device can reasonably coexist on an unlicensed spectrum.

In a first aspect, a wireless communication method is provided, and the method includes:
- determining, by a terminal device, a first periodic channel occupancy, the first periodic channel occupancy being a channel occupancy for the terminal device to perform initiation, the first periodic channel occupancy including a first channel occupancy;
- initiating, by the terminal device, the first channel occupancy, or, determining, by the terminal device, whether to initiate the first channel occupancy.

In a second aspect, a wireless communication method is provided, and the method includes:
- transmitting, by a network device, at least one configuration information to a terminal device, the at least one configuration information being used by the terminal device to determine a first periodic channel occupancy, the first periodic channel occupancy being a channel occupancy for the terminal device to perform initiation, the first periodic channel occupancy including a first channel occupancy, where the first channel occupancy is a channel occupancy initiated by the terminal device, or, the first channel occupancy is a channel occupancy for which the terminal device determines whether to perform initiation.

In a third aspect, a terminal device is provided and the terminal device is configured for performing the method in the first aspect described above.

Specifically, the terminal device includes a functional module configured for performing the method in the first aspect described above.

In a fourth aspect, a network device is provided and the network device is configured for performing the method in the second aspect described above.

Specifically, the network device includes a functional module configured for performing the method in the second aspect described above.

In a fifth aspect, a terminal device including a processor and a memory is provided. The memory is configured to store a computer program, and the processor is configured to call and run the computer program stored in the memory to perform the method in the first aspect described above.

In a sixth aspect, a network device including a processor and a memory is provided. The memory is configured to store a computer program, and the processor is configured to call and run the computer program stored in the memory to perform the method in the second aspect described above.

In a seventh aspect, an apparatus is provided for implementing the method in any one of the first to second aspects described above.

Specifically, the apparatus includes: a processor configured for calling and running a computer program from a memory to cause a device in which the apparatus is installed to perform the method in any one of the first to second aspects described above.

In an eighth aspect, a computer readable storage medium for storing a computer program is provided, where the computer program causes a computer to perform the method in any one of the first to second aspects described above.

In a ninth aspect, a computer program product is provided, where the computer program product includes computer program instructions, and the computer program instructions cause a computer to perform the method in any one of the first to second aspects described above.

In a tenth aspect, a computer program is provided, when the computer program is run on a computer, the computer is caused to perform the method in any one of the first to second aspects described above.

Based on the above technical scheme, after determining the first channel occupancy in the first periodic channel occupancy, the terminal device may initiate the first channel occupancy or may not initiate the first channel occupancy, so that the COT initiated by the network device and the COT initiated by the terminal device can be prevented from colliding on the unlicensed spectrum, i.e., the COT initiated by the network device and the COT initiated by the terminal device can reasonably coexist on the unlicensed spectrum, thus improving the communication performance.

DESCRIPTION OF EMBODIMENTS

Figure 1:
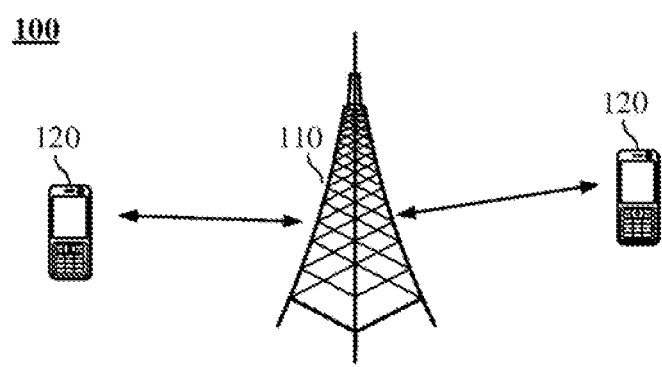
FIG. 1 is a schematic diagram of a communication system architecture applied in an embodiment of the present application.

The technical scheme in the embodiments of the present application will be described below in conjunction with the accompanying drawings in the embodiments of the present application, and it is clear that the embodiments described are a part of the embodiments of the present application, but not all of them. For the embodiments in the present application, all other embodiments obtained by a person of ordinary skill in the art without making creative labor belong to the scope of protection of the present application.

The technical scheme of the embodiments of the present application may be applied to various communication systems, such as: a global system of mobile communication (GSM), a code division multiple access (CDMA) system, a wideband code division multiple access (WCDMA) system, a general packet radio service (GPRS) system, a long term evolution (LTE) system, an advanced long term evolution (LTE-A) system, a new radio (NR) system, an evolution system for the NR system, an LTE-based access to unlicensed spectrum (LTE-U) system, an NR-based access to unlicensed spectrum (NR-U) system, and a non-terrestrial network (NTN) system, a universal mobile telecommunication system (UMTS), a wireless local area network (WLAN), a wireless fidelity (WiFi) network, a 5th-generation (5G) system, or other communication systems.

Generally speaking, the number of connections supported by the traditional communication system is limited and easy to implement. However, with the development of communication technologies, a mobile communication system will support not only the traditional communication, but also, for example, device to device (D2D) communication, machine to machine (M2M) communication, machine type communication (MTC), vehicle to vehicle (V2V) communication, or vehicle to everything (V2X) communication, etc. The embodiments of the present application can also be applied to these communication systems.

In an embodiment, the communication system in the embodiments of the present application may be applied to a carrier aggregation (CA) scenario, a dual connectivity (DC) scenario, and a standalone (SA) deployment scenario.

In an embodiment, the communication system in the embodiments of the present application may be applied to an unlicensed spectrum, where the unlicensed spectrum may also be considered as a shared spectrum; or, the communication system in the embodiments of the present application may also be applied to a licensed spectrum, where the licensed spectrum may also be considered as a non-shared spectrum.

Embodiments of the present application describe various embodiments in conjunction with a network device and a terminal device, where the terminal device may also be referred to as a user equipment (UE), an access terminal, a user unit, a user station, a mobile station, a mobile platform, a remote station, a remote terminal, a mobile device, a user terminal, a terminal, a wireless communication device, a user agent, or a user device.

The terminal device may be a station (ST) in a WLAN and may be a cellular telephone, a cordless telephone, a session initiation protocol SIP) telephone, a wireless local loop (WLL) station, a personal digital assistant (PDA) device, a handheld device with a wireless communication capability, a computing device or other processing devices connected to a wireless modem, a vehicle-mounted device, a wearable device, a terminal device in a next-generation communication system such as an NR network, or a terminal device in a future evolved public land mobile network (PLMN), and so on.

In the embodiments of the present application, the terminal device can be deployed on land, including indoor or outdoor, handheld, wearable or vehicle-mounted; it can also be deployed on water surface (e.g., on a ship, etc.); and it can also be deployed in the air (e.g., on an aircraft, a balloon, a satellite, etc.).

In the embodiments of the present application, the terminal device can be a mobile phone, a pad, a computer with a wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, or a wireless terminal device in smart home, and so on.

By way of example and not limitation, in the embodiments of the present application, the terminal device may also be a wearable device. The wearable device can also be called a wearable smart device, which is a general name for wearable devices developed by intelligently designing everyday wear using applying wearable technologies, such as glasses, gloves, watches, clothing and shoes. A wearable device is a portable device that is worn directly on the body or integrated into a user's clothing or accessories. The wearable device is not only a hardware device, but can also realize a powerful function through software support as well as data interaction and cloud interaction. Broadly speaking, the wearable smart device includes a full-featured and large-sized device that can achieve complete or partial functions without relying on a smartphone, such as a smart watch or a smart glass, as well as various types of smart bracelets and smart jewelries for monitoring physical sign that focus simply on a certain type of application function and need to be used in conjunction with another device such as a smartphone.

In the embodiments of the present application, the network device may be a device for communicating with a mobile device, and the network device may be an access point (AP) in WLAN, a base transceiver station (BTS) in GSM or CDMA, or a base station (NodeB, NB) in WCDMA, or may be an evolved base station (Evolutional Node B, eNB or eNodeB) in LTE, or a relay station or an access point, or a vehicle-mounted device, a wearable device, and a network device or a base station (gNB) in an NR network or a network device in a future evolved PLMN network or a network device in an NTN network, and so on.

By way of example and not limitation, in the embodiments of the present application, the network device may have mobile characteristics, for example, the network device may be a movable device. In an embodiment, the network device may be a satellite, a balloon station. For example, the satellite may be a low earth orbit (LEO) satellite, a medium earth orbit (MEO) satellite, a geostationary earth orbit (GEO) satellite, a high elliptical orbit (HEO) satellite, and so on. In an embodiment, the network device can also be a base station installed on land, water, etc.

In the embodiments of the present application, the network device may provide service to a cell, and the terminal device communicates with the network device through transmission resources (e.g., frequency domain resource, or spectrum resources) used by the cell, where the cell may be a cell corresponding to the network device (e.g., base station), and the cell may belong to a macro base station or a base station corresponding to a small cell, where the small cell may include a metro cell, a micro cell, a pico cell, a femto cell, and so on. These small cells have the characteristics of small coverage area and low transmit power, and are suitable for providing a high speed data transmission service.

Exemplarily, a communication system 100 applied in the embodiments of the present application is shown in FIG. 1. The communication system 100 may include a network device 110, and the network device 110 may be a device that communicates with a terminal device 120 (or referred to as a communication terminal, terminal). The network device 110 may provide communication coverage for a specific geographic area and may communicate with a terminal device located within that coverage area.

FIG. 1 exemplarily illustrates one network device and two terminal devices, in an embodiment, the communication system 100 may include multiple network devices and other numbers of terminal devices may be included in the coverage area of each network device, which are not limited in the embodiments of the present application.

In an embodiment, the communication system 100 may also include other network entities such as a network controller, a mobile management entity, etc., which are not limited in the embodiments of the present application.

It should be understood that the device in the network/system with a communication function in the embodiments of the present application may be referred to as a communication device. Taking the communication system 100 illustrated in FIG. 1 as an example, the communication device may include the network device 110 and the terminal device 120 having communication functions, and the network device 110 and the terminal device 120 may be specific devices as described above and will not be described here. The communication device may also include other devices in the communication system 100, such as a network controller, a mobile management entity, which are not limited in the embodiments of the present application.

It should be understood that the terms "system" and "network" are often used interchangeably herein. The term "and/or" herein is simply a description of the association of related objects, indicating that three relationships may exist. For example, A and/or B may mean: only A is present; only B is present; both A and B are present. In addition, the character "/" herein generally indicates that the associated objects before and after is in an "or" relationship.

The terms used in the section of description of the embodiments of the present application are intended to explain specific embodiments of the present application only, and are not intended to limit the present application. The terms "first", "second", "third", and "fourth" in the specification and claims of the present application and the accompanying drawings are used to distinguish between different objects and are not intended to describe a particular order. In addition, the terms "including" and "having", and any variations thereof, are intended to cover non-exclusive inclusion.

It should be understood that the reference to "indicate" in the embodiments of the present application may be a direct indication, an indirect indication, or an indication of an associative relationship. For example, A indicates B, which may mean: A directly indicates B, for example, B can be obtained through A; or A indirectly indicates B, for example, A indicates C and B is accessible through C; or there may be an association between A and B.

In the description of the embodiments of the present application, the term "correspond" may indicate a direct correspondence or indirect correspondence between the two, or may indicate an association between the two, or may be a relationship of indicating and being indicated, configuring and being configured, etc.

In an embodiment, in the embodiments of the present application, indication information or configuration information includes physical layer signaling such as at least one of downlink control information (DCI), system information (SI), radio resource control (RRC) signaling and media access control control element (MAC CE).

In an embodiment, in the embodiments of the present application, a higher layer parameter or a higher layer signaling includes at least one of a radio resource control (RRC) signaling and a media access control control element (MAC CE).

An unlicensed spectrum is a spectrum divided by countries and regions that can be used for radio device communication, the unlicensed spectrum is usually considered as a shared spectrum, i.e., communication devices in different communication systems can use the spectrum as long as they meet the regulatory requirements set by the country or region on the spectrum, and do not need to apply to the government for exclusive spectrum authorization.

In order to allow various wireless communication systems using the unlicensed spectrum for wireless communication to coexist amicably in that spectrum, some countries or regions have set regulatory requirements that must be met in order to use unlicensed spectrum. For example, the communication device follows the "listen before talk (LBT)" principle, i.e., the communication device needs to perform channel listening before transmitting a signal on a channel of the unlicensed spectrum, and the communication device can transmit the signal only when a result of the channel listening is that the channel is free. If the result of the channel listening of the communication device on the channel of the unlicensed spectrum is that the channel is busy, the communication device cannot transmit the signal. In order to ensure fairness, in one transmission, a period during which the communication device uses the channel of the unlicensed spectrum for signal transmission cannot be longer than a maximum channel occupation time (MCOT).

In the unlicensed spectrum, the network device needs to perform LBT before transmitting a downlink channel or a downlink signal, and can transmit only when the LBT is successful, and cannot transmit when the LBT is failed. Therefore, the communication on the unlicensed spectrum is an opportunistic transmission. From the perspective of system deployment, channel detection includes two mechanisms, one is LBT for load based equipment (LBE), also known as dynamic channel detection, dynamic channel access or dynamic channel occupancy, and the other is LBT for frame based equipment (FBE), also known as semi-static channel detection, semi-static channel access, or semi-static channel occupancy.

In the FBE channel access mechanism, or in other words, the semi-static channel access mode, a frame structure appears periodically, i.e., channel resources available to the communication device for service transmission appear periodically. Within a frame structure, a fixed frame period (FFP), a channel occupancy time (COT), and an idle period (IP) are included. A value range of a length of the FFP may be, for example, 1 to 10 ms, a length of a channel occupancy time COT does not exceed 95% of a length of a fixed frame period FFP, and a length of an idle period (IP) is at least 5% of the length of the fixed frame period FFP and a minimum value of the IP is 100 μs and the IP is located at the end of the fixed frame period FFP.

The communication device performs sensing for assessing a channel availability (sensing for evaluating a channel availability, also called idle channel evaluation (CCA)) during the idle period. If the channel detection is successful, a channel occupancy time COT in a next fixed frame period may be used to transmit a signal and if the channel detection is failed, the channel occupancy time in the next fixed frame period cannot be used to transmit the signal.

Figure 2:
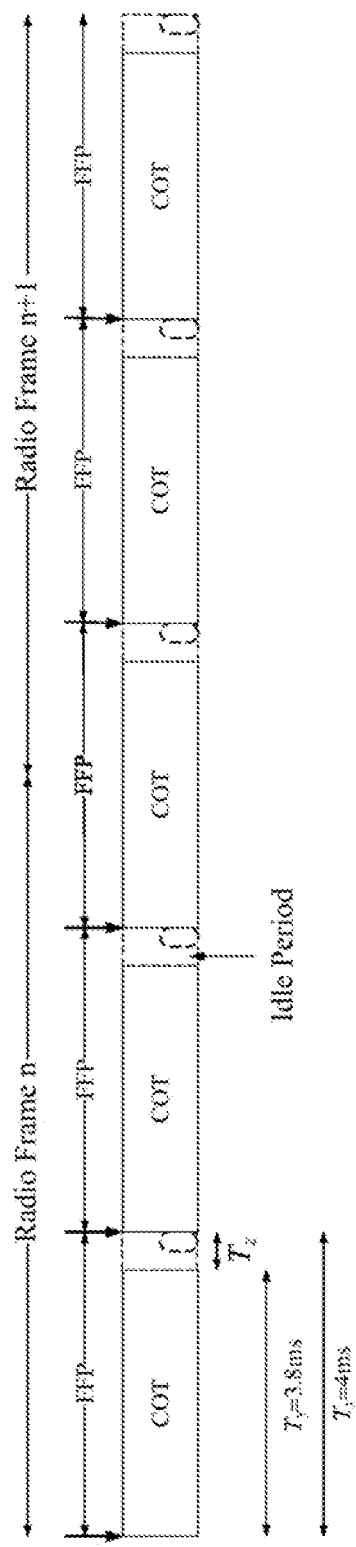
FIG. 2 is a schematic diagram of a semi-static channel occupancy provided by the present application.

Currently, in an NR-U system, only COT initiated by the network device is supported in the FBE mode. The semi-static channel access mode may be indicated by the base station through a System Information Block (SIB) 1 or configured through a higher layer parameter. Referring to FIG. 2, the length $T_x$ of the fixed frame period (FFP) may be configured by the base station, the unit of $T_x$ is ms, and a value range of $T_x$ may include, for example, 1, 2, 2.5, 4, 5 and 10. Starting from every two consecutive radio frames, within every two consecutive radio frames, a starting location of the FFP is determined according to $x \cdot T_x$, where $x \in \{0, 1, \ldots, 20/T_x - 1\}$, a maximum COT length within the FFP is $T_y = 0.95 \cdot T_x$, and a length of an idle period within the FFP is at least $T_z = \max(0.05 \cdot T_x, 100 \text{ μs})$.

If the semi-static channel access mode is configured for a service cell, then a length of a periodic channel occupancy of the service cell is $T_x$, a length of a maximum channel occupancy included in the length of the periodic channel occupancy of the service cell is $T_y$, and a length of an idle period included in the length of the periodic channel occupancy of the service cell is $T_z$. The terminal device may determine $T_y$ and/or $T_z$ according to the configured $T_x$. For example, as described above, after determining the length $T_x$ of the FFP, the terminal device may determine, according to a predetermined rule, the starting location of the FFP, the period of the FFP, the maximum COT length used for signal transmission within the FFP, the idle period used for channel detection within the FFP, and other information.

In the existing NR-U system, if the system is in the FBE mode, then the terminal device is not allowed to initiate the COT. If the terminal device is intended to perform uplink transmission, the terminal device can only share the COT of the base station. The channel detection of the terminal device is to perform energy detection with a length of 9 microseconds in a detection time slot channel of 16 microseconds or 25 microseconds, and transmission is performed after the energy detection passes. Alternatively, if a gap between a starting location of an uplink transmission of the terminal device and an end location of a downlink transmission of the base station is less than or equal to 16 microseconds, the terminal device may perform the uplink transmission directly without channel detection. Specifically, in the FBE mode, when the terminal device is scheduled for transmission of a physical uplink shared channel (PUSCH) or a physical uplink control channel (PUCCH), the network device may indicate a channel listening mode corresponding to the PUSCH or PUCCH and a size of a delay cyclic prefix to be transmitted by the terminal device through downlink control information (DCI) carrying an uplink grant (UL grant) or a downlink grant (DL grant).

In the NR-U system, it is currently considered to support the COT initiated by the terminal device in the FBE mode. In this case, how to carry out the signal/channel transmission to ensure a reasonable coexistence of the COT initiated by the network device and the COT initiated by the terminal device on the unlicensed spectrum is the main consideration of the present application.

Based on the above problem, the present application proposes a scheme for initiating a COT by a terminal device, which can enable the COT initiated by the network device and the COT initiated by the terminal device to reasonably coexist on the unlicensed spectrum and improve communication performance.

The technical scheme of the present application is described in detail in the following specific embodiments.

Figure 3:
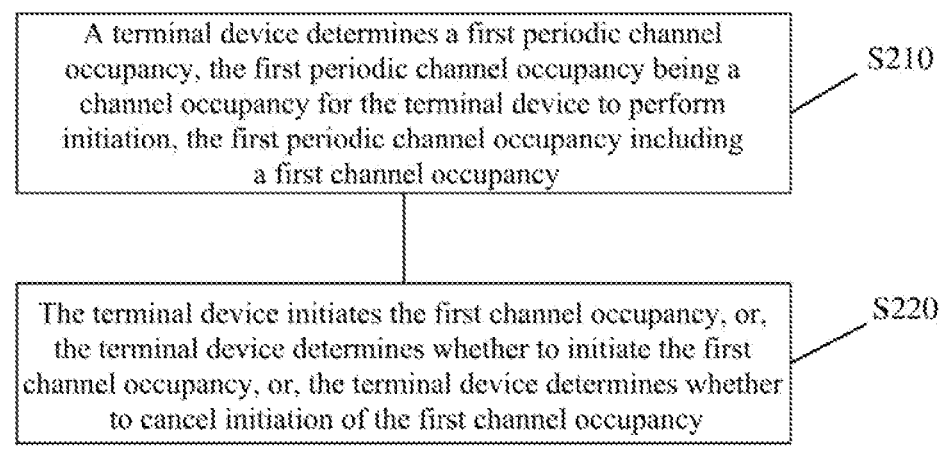
FIG. 3 is a schematic flowchart of a wireless communication method according to an embodiment of the present application.

FIG. 3 is a schematic flow diagram of a wireless communication method 200 according to an embodiment of the present application. As shown in FIG. 3, the wireless communication method 200 may include at least some of the following:

S210, a terminal device determines a first periodic channel occupancy, the first periodic channel occupancy being a channel occupancy for the terminal device to perform initiation, the first periodic channel occupancy including a first channel occupancy;

S220, the terminal device initiates the first channel occupancy, or, the terminal device determines whether to initiate the first channel occupancy, or, the terminal device determines whether to cancel initiation of the first channel occupancy.

It is noted that, in the embodiments of the present application, the first periodic channel occupancy may be equivalent to an FFP corresponding to a first FFP, and the first channel occupancy may be equivalent to the first FFP.

In an embodiment, the first channel occupancy includes a first COT and a first IP.

In an embodiment of the present application,
the first periodic channel occupancy is a periodic channel occupancy corresponding to one periodic channel occupancy configured for the terminal device; or
the first periodic channel occupancy is one periodic channel occupancy of a plurality of periodic channel occupancies configured for the terminal device.

In an embodiment of the present application, the terminal device may determine the first periodic channel occupancy through a scheme in at least one of the following Examples 1 to 4, that is to say, S210 may be a scheme in at least one of the following Examples 1 to 4.

Example 1, the terminal device determines the first periodic channel occupancy according to first configuration information, where,
the first configuration information is used to indicate at least one of the followings:
a length of the first periodic channel occupancy, a period of the first periodic channel occupancy, a COT length in the first periodic channel occupancy, a maximum COT length in the first periodic channel occupancy, an IP length in the first periodic channel occupancy, and a minimum IP length in the first periodic channel occupancy.

In an embodiment, the length of the first periodic channel occupancy is the same as the period of the first periodic channel occupancy.

In an embodiment, in Example 1, the terminal device receives the first configuration information transmitted by a network device.

In an embodiment, the first configuration information is a specific signaling of the terminal device, or, the first configuration information is a common signaling of the terminal device.

In an embodiment, the first configuration information is carried in SIB1, or, the first configuration information is carried in a higher layer signaling.

In an embodiment, the first periodic channel occupancy is continuous in a time domain. In this case, in Example 1, the first configuration information is used to indicate the length of the first periodic channel occupancy, or, the first configuration information is used to indicate the period of the first periodic channel occupancy.

In an embodiment, the first periodic channel occupancy may also be non-contiguous in the time domain.

For example, in Example 1, the network device configures a length $T_{x1}$, in the unit of ms, of the first periodic channel occupancy for the terminal device via the first configuration information, and a value range of $T_{x1}$ may include, for example, 1, 2, 2.5, 4, 5, 10. Starting from every two consecutive radio frames, within every two consecutive radio frames, a starting location of the first periodic channel occupancy is determined according to $x1 \cdot T_{x1}$, where $x1 \in \{0, 1, \ldots, 20/T_{x1}-1\}$, the maximum COT length in the first periodic channel occupancy is $T_{y1}=0.95 \cdot T_{x1}$, and the minimum IP length in the first periodic channel occupancy is $T_{z1}=\max(0.05 \cdot T_{x1}, 100 \mu s)$.

For example, in Example 1, the length $T_{x1}$ of the first periodic channel occupancy configured by the network device for the terminal device through the first configuration information is 4 ms. Starting from every two consecutive radio frames, within every two consecutive radio frames, the starting location of the first periodic channel occupancy is determined according to $4 \cdot x$, where $x \in \{0,1,2,3,4\}$, that is to say, there are 5 channel occupancies in every 20 ms. The maximum COT length in the first periodic channel occupancy is $T_{y1}=3.8$ ms, and the minimum IP length in the first periodic channel occupancy is $T_{z1}=0.2$ ms.

In an embodiment, the length of the first COT included in the first channel occupancy is indicated by the network device. For example, in Example 1, the network device indicates the length of the first COT by means of the first configuration information. Alternatively, the length of the first COT included in the first channel occupancy is determined according to the maximum COT length $T_{y1}$ in the first periodic channel occupancy.

In an embodiment, the maximum COT length in the first periodic channel occupancy is indicated by the network device, or, the maximum COT length in the first periodic channel occupancy is determined by the terminal device based on a configuration parameter of the network device. For example, the network device configures the length $T_{x1}$ of the first periodic channel occupancy to be 4 ms, and the terminal device determines the maximum COT length of the first periodic channel occupancy to be $T_{y1}=3.8$ ms based on $T_{y1}=0.95 \cdot T_{x1}$.

Example 2, the terminal device determines the first periodic channel occupancy according to a second periodic channel occupancy, where, a period of the first periodic channel occupancy is the same as a period of the second periodic channel occupancy, or, a length of the first periodic channel occupancy is the same as a length of the second periodic channel occupancy.

That is, in example 2, the terminal device may determine the first periodic channel occupancy based on the second periodic channel occupancy because the period of the first periodic channel occupancy is the same as the period of the second periodic channel occupancy, or the length of the first periodic channel occupancy is the same as the length of the second periodic channel occupancy.

In an embodiment, in Example 2, the second periodic channel occupancy may be configured or indicated by the network device.

Example 3, the terminal device determines the first periodic channel occupancy according to second configuration information, where, the second configuration information is used to indicate a period of a second periodic channel occupancy or a length of the second periodic channel occupancy, a period of the first periodic channel occupancy is the same as the period of the second periodic channel occupancy, or, a length of the first periodic channel occupancy is the same as the length of the second periodic channel occupancy.

In an embodiment, in Example 3, the terminal device receives the second configuration information transmitted by a network device.

That is to say, in Example 3, the terminal device may determine the first periodic channel occupancy based on the second configuration information because the period of the first periodic channel occupancy is the same as the period of the second periodic channel occupancy, or the length of the first periodic channel occupancy is the same as the length of the second periodic channel occupancy.

In an embodiment, in Example 3, the second configuration information is a specific signaling of the terminal device or the second configuration information is a common signaling of the terminal device. In addition, the second configuration information is carried in SIB1, or the second configuration information is carried in a higher layer signaling.

For example, in Example 3, the network device configures a length $T_{x2}$, in the unit of ms, of the second periodic channel occupancy for the terminal device through the second configuration information, and a value range of $T_{x2}$ may include, for example, 1, 2, 2.5, 4, 5, 10. Among them, starting from every two consecutive radio frames, within every two consecutive radio frames, a starting location of the second periodic channel occupancy is determined according to $x2 \cdot T_{x2}$, where $x2 \in \{0, 1, \ldots, 20/T_{x2}-1\}$, a maximum COT length in the second periodic channel occupancy is $T_{y2}=0.95 \cdot T_{x2}$, and the minimum IP length in the second periodic channel occupancy is $T_{z2}=\max(0.05 \cdot T_{x2}, 100 \mu s)$.

In some embodiments, in the above Examples 2 and 3, the period of the first periodic channel occupancy and the period of the second periodic channel occupancy may have other correlations in addition to being the same, for example, the period of the first periodic channel occupancy is an integer multiple of the period of the second periodic channel occupancy. For another example, the period of the second periodic channel occupancy is an integer multiple of the period of the first periodic channel occupancy.

In an embodiment, in the above Examples 2 and 3, an offset value between the first periodic channel occupancy and the second periodic channel occupancy is predetermined. Alternatively, the offset value between the first periodic channel occupancy and the second periodic channel occupancy is agreed in a protocol.

In an embodiment, in the above Examples 2 and 3, an offset value between the first periodic channel occupancy and the second periodic channel occupancy is determined according to third configuration information.

In an embodiment, the third configuration information is a specific signaling of the terminal device or the third configuration information is a common signaling of the terminal device. Further, the third configuration information is carried in SIB1, or the third configuration information is carried in a higher layer signaling.

In an embodiment, the terminal device receives the third configuration information transmitted by the network device.

In an embodiment, in the above Examples 2 and 3,
an offset value between the first periodic channel occupancy and the second periodic channel occupancy is a positive offset value; or
an offset value between the first periodic channel occupancy and the second periodic channel occupancy is a negative offset; or
an offset value between the first periodic channel occupancy and the second periodic channel occupancy is 0.

In an embodiment, in the above Examples 2 and 3, the second periodic channel occupancy is a channel occupancy for the network device to perform initiation, and the second periodic channel occupancy includes a second channel occupancy. In an embodiment, the second channel occupancy includes a second COT and a second IP.

In an embodiment, in the above Examples 2 and 3,
a frequency domain resource corresponding to the first periodic channel occupancy and a frequency domain resource corresponding to the second periodic channel occupancy are partially overlapped in a frequency domain; or
a frequency domain resource of the first periodic channel occupancy and a frequency domain resource of the second periodic channel occupancy are fully overlapped in a frequency domain; or
a frequency domain resource of the first periodic channel occupancy and a frequency domain resource of the second periodic channel occupancy do not overlap in a frequency domain.

In an embodiment, in the above Examples 2 and 3,
the first periodic channel occupancy includes a first channel occupancy, and the first channel occupancy includes a first COT and a first IP, and the second periodic channel occupancy includes a second channel occupancy, and the second channel occupancy includes a second COT and a second IP,
in such a case, a relationship of time domain locations of the first channel occupancy in the first periodic channel occupancy and the second channel occupancy in the second periodic channel occupancy includes, but is not limited to, at least one of the followings:
the second channel occupancy including the first channel occupancy;
the second COT including the first channel occupancy;
the second IP including the first channel occupancy;
the first channel occupancy including the second channel occupancy;
the first COT including the second channel occupancy;
the first IP including the second channel occupancy;
the first channel occupancy and the second channel occupancy being at least partially overlapped;
the first COT and the second COT being at least partially overlapped;
the first IP and the second IP being at least partially overlapped;
the second COT including the first COT and the first IP including the second IP;
the first COT including the second COT, and the second IP including the first IP;
the first channel occupancy including a plurality of channel occupancies in the second periodic channel occupancy;
the second channel occupancy including a plurality of channel occupancies in the first periodic channel occupancy.

Figure 4:
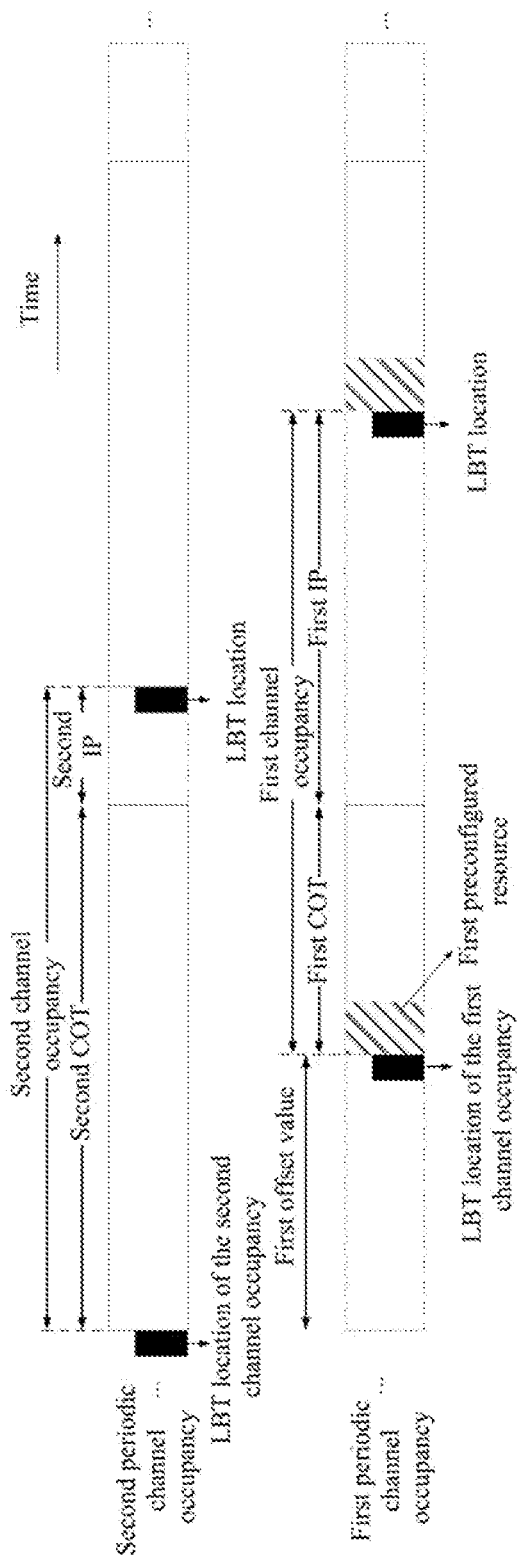
FIG. 4 is a schematic diagram of a first periodic channel occupancy and a second periodic channel occupancy according to an embodiment of the present application.

For example, as shown in FIG. 4, the first periodic channel occupancy is a channel occupancy for the terminal device to perform initiation, and the first periodic channel occupancy includes a first channel occupancy, the first channel occupancy includes a first COT and a first IP, and a first resource on a first time slot of the first channel occupancy is used to transmit a first uplink channel and/or uplink signal, for example, the first resource includes a first uplink preconfigured resource. The second periodic channel occupancy is a channel occupancy for the network device to perform initiation, and the second periodic channel occupancy includes a second channel occupancy, and the second channel occupancy includes a second COT and a second IP. In FIG. 4, by way of example, a time domain resource occupied by the second COT includes a time domain resource occupied by the first COT, and a time domain resource occupied by the first IP includes a time domain resource occupied by the second IP. It should be understood that by configuring the time domain resource occupied by the first IP to include the time domain resource occupied by the second IP, no signal transmission is allowed in the time domain resource occupied by the second IP, so that the time domain resource occupied by the second IP can be used by other systems for channel detection, thus ensuring fairness in the use of the shared spectrum. In addition, the length of the first periodic channel occupancy and the length of the second periodic channel occupancy are the same, and a first offset value between the first periodic channel occupancy and the second periodic channel occupancy is a positive offset value, or a starting location of the first channel occupancy is within the second COT.

Figure 5:
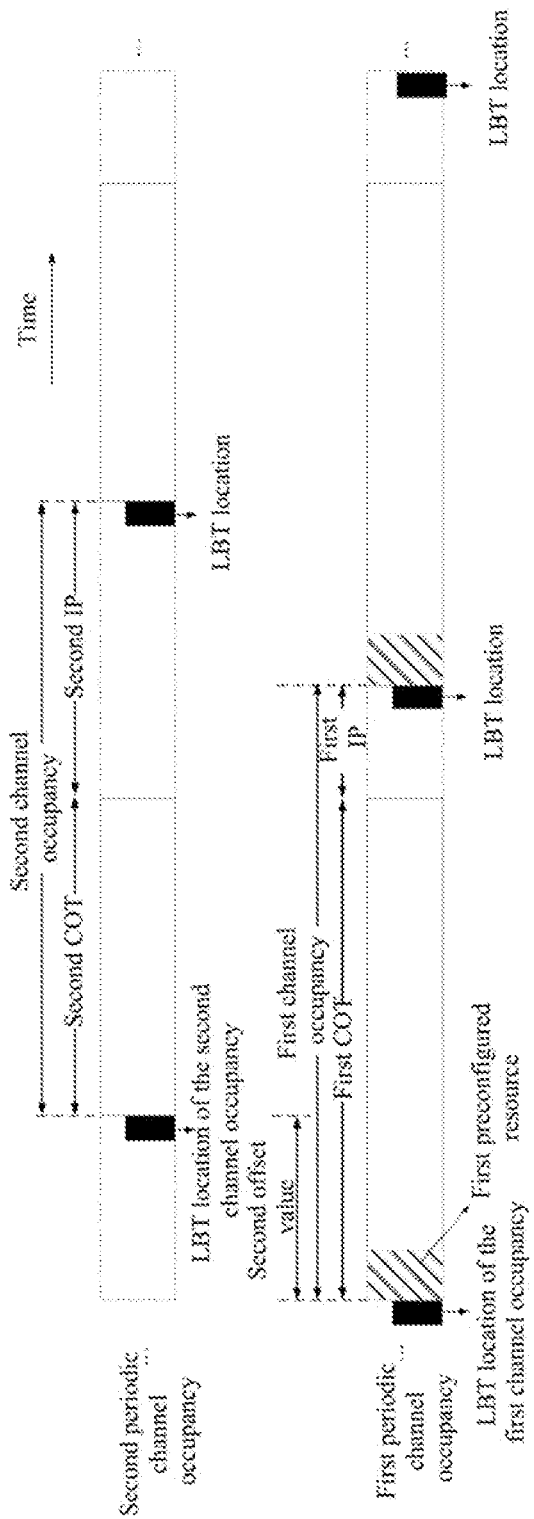
FIG. 5 is schematic diagram of another first periodic channel occupancy and second periodic channel occupancy according to an embodiment of the present application.

As another example, as shown in FIG. 5, the first periodic channel occupancy is a channel occupancy for the terminal device to perform initiation, and the first periodic channel occupancy includes a first channel occupancy, the first channel occupancy includes a first COT and a first IP, and a first resource on a first time slot in the first channel occupancy is used to transmit a first uplink channel and/or uplink signal, for example, the first resource includes a first uplink preconfigured resource. The second periodic channel occupancy is a channel occupancy for the network device to perform initiation, and the second periodic channel occupancy includes a second channel occupancy, and the second channel occupancy includes a second COT and a second IP. In FIG. 5, by way of example, a time domain resource occupied by the first COT includes a time domain resource occupied by the second COT, and a time domain resource occupied by the second IP includes a time domain resource occupied by the first IP. It should be understood that by configuring the time domain resource occupied by the second IP to include the time domain resource occupied by the first IP, no signal transmission is allowed in the time domain resource occupied by the first IP, so that the time domain resource occupied by the first IP can be used by other systems for channel detection, and thus fairness in the use of the shared spectrum can be ensured. In addition, the length of the first periodic channel occupancy and the length of the second periodic channel occupancy are the same, and a second offset value between the first periodic channel occupancy and the second periodic channel occupancy is a negative offset value, or a starting location of the second channel occupancy is within the first COT.

Example 4, the terminal device determines the first periodic channel occupancy according to fourth configuration information, where in an embodiment, the fourth configuration information is used to indicate a period of the first uplink preconfigured resource, a period of the first periodic channel occupancy is the same as the period of the first uplink preconfigured resource.

In an embodiment, the fourth configuration information is used to indicate a starting location of the first uplink preconfigured resource, where a starting location of a channel occupancy included in the first periodic channel occupancy is the same as a starting location of an uplink preconfigured resource corresponding to the first uplink preconfigured resource; or, the terminal device determines the starting location of the first periodic channel occupancy according to the fourth configuration information.

In an embodiment, the terminal device determines an offset value between the first periodic channel occupancy and the second periodic channel occupancy according to the fourth configuration information, where the fourth configuration information is used to indicate the starting location of the first uplink preconfigured resource, and the second periodic channel occupancy is a channel occupancy for the network device to perform initiation as previously described.

In an embodiment, in the above Examples 2 and 3, an offset value between the first periodic channel occupancy and the second periodic channel occupancy is determined based on the fourth configuration information.

In an embodiment, the terminal device receives the fourth configuration information transmitted by the network device.

In some embodiments, in the above Example 4, the period of the first periodic channel occupancy and the period of the first uplink preconfigured resource may have other correlations in addition to being the same, for example, the period of the first periodic channel occupancy is an integer multiple of the period of the first uplink preconfigured resource. For another example, the period of the first uplink preconfigured resource is an integer multiple of the period of the first periodic channel occupancy.

In an embodiment, the first uplink preconfigured resource is used to transmit a first uplink channel and/or uplink signal.

In an embodiment, a starting location of the first uplink preconfigured resource is the same as a starting location of the first channel occupancy.

In an embodiment, in some embodiments, a first resource on a first time slot in the first channel occupancy is used to transmit a first uplink channel and/or uplink signal, where a starting location of the first resource is the same as a starting location of the first channel occupancy.

In an embodiment, the first resource includes a first uplink preconfigured resource; or, the first resource includes an uplink resource indicated by a first uplink grant. In an embodiment, a period of the first uplink preconfigured resource is the same as a period of the first periodic channel occupancy.

In an embodiment, the first uplink grant includes, but is not limited to, at least one of the followings:

a DCI format, such as a DCI format 0_0, a DCI format 0_1, or a DCI format 0_2, etc., a random access response uplink grant (RAR UL grant), a fallback random access response uplink grant (fallback RAR UL grant), a success random access response (successRAR).

In an embodiment, the first uplink channel and/or uplink signal includes, but is not limited to, at least one of the followings:

a physical uplink control channel (PUCCH), a physical random access channel (PRACH), a physical uplink shared channel (PUSCH), and a sounding reference signal (SRS).

It is noted that when the first uplink preconfigured resource is a resource configured for transmitting a PRACH, the first uplink preconfigured resource may be a random access opportunity (RACH occasion, RO) resource. Further, when the first uplink preconfigured resource is a resource configured for transmitting a PUSCH, what transmitted on the first uplink preconfigured resource is a configured grant-PUSCH (CG-PUSCH).

In an embodiment, in the embodiments of the present application, the terminal device may determine whether to initiate the first channel occupancy, or in other words, determine whether to cancel initiation of the first channel occupancy, though the scheme in Example 5 below.

Example 5, where the terminal device determines whether to initiate the first channel occupancy includes one of the followings:

the terminal device always determining to initiate the first channel occupancy;

the terminal device determining whether to initiate the first channel occupancy according to a first condition;

if the terminal device is configured with a condition that enables initiation of the first channel occupancy, the terminal device determining to initiate the first channel occupancy;

if the terminal device is configured with a COT sharing energy detection threshold (e.g. configured with a higher layer parameter ul-toDL-COT-SharingED-Threshold-r16), the terminal device determining to initiate the first channel occupancy;

if the terminal device is not configured with the COT sharing energy detection threshold, the terminal device determining not to initiate the first channel occupancy;

if the terminal device is configured with the COT sharing energy detection threshold, the terminal device determining whether to initiate the first channel occupancy according to the first condition; and if the terminal device is not configured with the COT sharing energy detection threshold, the terminal device determining whether to initiate the first channel occupancy according to the first condition.

In Example 5, in a case that the terminal device always determines to initiate the first channel occupancy, the terminal device may always perform channel detection prior to the first channel occupancy.

The first periodic channel occupancy includes a first channel occupancy, and the first channel occupancy includes a first COT, and the first periodic channel occupancy is a channel occupancy for the terminal device to perform initiation; the second periodic channel occupancy includes a second channel occupancy, and the second channel occupancy includes a second COT, and the second periodic channel occupancy is a channel occupancy for the network device to perform initiation. For example, assuming that the second COT is within the first COT, if the terminal device obtains the first COT, the terminal device may share a resource in the first COT with the network device so that the network device may perform downlink transmission over the resource in the first COT or in the second COT in a shared manner. Again, for example, if the terminal device does not obtain the first COT, the network device may initiate the second COT and, upon obtaining the second COT, perform downlink transmission over the resource in the second COT. Further, the network device may share the resource in the second COT with the terminal device.

In an embodiment, in Example 5, where the terminal device determines whether to initiate the first channel occupancy according to a first condition includes, but not limited to, one of the followings:

if the terminal device receives a first downlink channel and/or downlink signal transmitted by the network device, the terminal device determining not to initiate the first channel occupancy; for example, if the terminal device receives the first downlink channel and/or downlink signal transmitted by the network device, the terminal device may share the COT of the network device and therefore the terminal device may not initiate the COT;

if the terminal device fails to receive a first downlink channel and/or downlink signal transmitted by the network device, the terminal device determining to initiate the first channel occupancy; for example, if the terminal device fails to receive a first downlink channel and/or downlink signal transmitted by the network device, the terminal device may initiate the COT on its own for uplink transmission;

if the terminal device determines that a first resource on a first time slot in the first channel occupancy is not available for transmission of a first uplink channel and/or the uplink signal, the terminal device determining not to initiate the first channel occupancy; for example, if the terminal device determines that the first resource is not available for uplink transmission and transmission over the first resource cannot be realized even channel detection performed by the terminal device is successful, the terminal device may not initiate the first channel occupancy;

if the terminal device determines that a first resource on a first time slot in the first channel occupancy is available for transmission of a first uplink channel and/or uplink signal, the terminal device determining to initiate the first channel occupancy.

In an embodiment, the first condition may be preconfigured or agreed in a protocol, or, alternatively, the first condition is configured by the network device.

In an embodiment, in Example 5, the first resource on the first time slot in the first channel occupancy includes a first uplink preconfigured resource, where the terminal device determines whether to initiate the first channel occupancy according to the first condition includes, but not limited to, one of the followings:

in a case that there is no uplink channel or uplink signal to be transmitted on the first uplink preconfigured resource, the terminal device determining not to initiate the first channel occupancy;

in a case that there is no uplink channel or uplink signal to be transmitted on the first uplink preconfigured resource, if the terminal device fails to receive a first downlink channel and/or downlink signal transmitted by the network device, the terminal device determining to initiate the first channel occupancy; for example, the terminal device may share the resource in the first COT in the first channel occupancy with the network device for downlink transmission;

in a case that there is no uplink channel or uplink signal to be transmitted on the first uplink preconfigured resource, if the terminal device determines that a first resource on a first time slot in the first channel occupancy is available for transmission of a first uplink channel and/or uplink signal, the terminal device determining to initiate the first channel occupancy. The terminal device may, for example, share the resource in the first COT in the first channel occupancy with the network device for downlink transmission.

In an embodiment, where there is no uplink channel or uplink signal to be transmitted on the first uplink preconfigured resource includes: there being no unicast user data on the first uplink preconfigured resource. For example, there is no uplink shared channel (UL-SCH) on the first uplink preconfigured resource for the terminal device.

In an embodiment, in Example 5, where the terminal device determines that the first resource on the first time slot in the first channel occupancy is not available for transmission of the first uplink channel and/or uplink signal includes, but not limited to, at least one of the followings:

the terminal device determining, according to first indication information transmitted by the network device, that the first resource on the first time slot in the first channel occupancy is not available for transmission of the first uplink channel and/or uplink signal;

a symbol included in the first resource being indicated as a downlink symbol;

the terminal device determining, according to a first DCI format transmitted by the network device, that some or all of the symbol included in the first resource are used for transmission of a downlink channel and/or downlink signal;

the first resource including a first uplink preconfigured resource, the terminal device determining, according to a detected DCI format 2_0, that a symbol included in the first uplink preconfigured resource is indicated as a downlink symbol or a flexible symbol;

the first resource including a first uplink preconfigured resource, a symbol included in the first uplink preconfigured resource being indicated as a flexible symbol, the terminal device being configured to monitor a DCI format 2_0, and the terminal device being not configured with an enable uplink preconfigured parameter (e.g., not configured with a higher layer parameter EnableConfiguredUL-r16) and the terminal device failing to detect the DCI format 2_0.

In an embodiment, the first indication information may indicate that the first resource on the first time slot in the first channel occupancy is available for transmission of the first uplink channel and/or uplink signal, or the first indication information may also indicate that the first resource on the first time slot in the first channel occupancy is not available for transmission of the first uplink channel and/or uplink signal.

In an embodiment, the symbol included in the first resource is indicated as a downlink symbol. It may be indicated by the DCI format 2_0 that the symbol included in the first resource is a downlink symbol, or it may also be indicated by a higher layer parameter such as tdd-UL-DL- ConfigurationCommon or tdd-UL-DL-ConfigurationDedicated that the symbol included in the first resource is a downlink symbol.

In an embodiment, the first DCI format includes, for example, a DCI format 1_0, a DCI format 1_1, a DCI format 1_2, or a DCI format 0_1, and so on.

In an embodiment, in Example 5, where the terminal device determines that the first resource on the first time slot in the first channel occupancy is available for transmission of the first uplink channel and/or uplink signal includes at least one of the followings:
- the terminal device determining, according to first indication information transmitted by the network device, that the first resource on the first time slot in the first channel occupancy is available for transmission of the first uplink channel and/or uplink signal;
- the terminal device determining, according to a first uplink grant transmitted by the network device, that the first resource on the first time slot in the first channel occupancy is available for transmission of the first uplink channel and/or uplink signal, where the first uplink grant includes one of an uplink grant DCI format, a random access response uplink grant, a fallback random access response uplink grant, and a success random access response;
- the symbol included in the first resource being indicated as an uplink symbol;
- the first resource including a first uplink preconfigured resource, and a symbol included in the first uplink preconfigured resource being indicated as a flexible symbol and the terminal device being not configured to monitor a DCI format 2_0;
- the first resource including a first uplink preconfigured resource, the terminal device determining, according to a detected DCI format 2_0, that a symbol included in the first uplink preconfigured resource is indicated as an uplink symbol;
- the first resource including a first uplink preconfigured resource, a symbol included in the first uplink preconfigured resource being indicated as a flexible symbol, the terminal device being configured to monitor a DCI format 2_0, and the terminal device being configured with an enable uplink preconfigured parameter (e.g., being configured with a higher layer parameter Enable-ConfiguredUL-r16) and the terminal device failing to detect the DCI format 2_0.

In an embodiment, an uplink grant DCI format may be a DCI format 0_0, a DCI format 0_1, or a DCI format 0_2, and so on. In addition, the uplink grant DCI format may be used to schedule a PUSCH or to activate a CG-PUSCH.

In an embodiment, in Example 5, the first downlink channel and/or downlink signal includes, but is not limited to, at least one of the followings:
- a physical downlink control channel (PDCCH), a physical downlink shared channel (PDSCH), a synchronization signal/physical broadcast channel block (SS/PBCH), a channel state information reference signal (CSI-RS), a demodulation reference signal (DMRS), a phase tracking reference signal (PT-RS), and a tracking reference signal (TRS).

In an embodiment, the PDSCH includes a scheduled PDSCH or a semi-persistent scheduling (SPS) PDSCH.

For example, the first downlink channel and/or downlink signal includes a first PDCCH, and indication information 1 carried in the first PDCCH is used for indicating whether to initiate the first channel occupancy by the terminal device, or, the indication information 1 is used for indicating whether to cancel initiation of the first channel occupancy by the terminal device.

Again, for example, the first downlink channel and/or downlink signal includes a first PDCCH, and the first PDCCH carries a DCI format 2_0, and an additional information field in the DCI format 2_0 is indication information 2. The indication information 2 is used to indicate whether to initiate the first channel occupancy by the terminal device, or, the indication information 2 is used to indicate whether to cancel initiation of the first channel occupancy by the terminal device.

Further, for example, the first downlink channel and/or downlink signal includes a first PDCCH carrying the DCI format 2_0, and a directional indication of a symbol in the DCI format 2_0 is indication information 3, where the indication information 3 is, for example, an "U", a "D" or an "F" etc., where the "U" denotes an uplink symbol, the "D" denotes a downlink symbol, and the "F" denotes a flexible symbol.

In an embodiment, in Example 5, where the terminal device receives the first downlink channel and/or downlink signal transmitted by the network device may specifically be:
- the terminal device receiving the first downlink channel and/or downlink signal transmitted by the network device within a second COT in a second channel occupancy.

In an embodiment, in Example 5, where the terminal device fails to receive the first downlink channel and/or downlink signal transmitted by the network device may specifically be: the terminal device failing to receive the first downlink channel and/or downlink signal transmitted by the network device within the second COT in the second channel occupancy.

In an embodiment, in Example 5, the second channel occupancy is a channel occupancy for the network device to perform initiation, where a time domain resource in the second COT in the second channel occupancy includes a time domain resource in a first COT in the first channel occupancy, or, the time domain resource in the first COT includes a time domain resource in the second COT, or, the first COT and the second COT are at least partially overlapped in the time domain.

In an embodiment, in some embodiments of the present application,
- if the terminal device determines to initiate the first channel occupancy, the terminal device initiates the first channel occupancy; or
- if the terminal device determines not to initiate the first channel occupancy, the terminal device cancels initiation of the first channel occupancy; or
- if the terminal device determines not to initiate the first channel occupancy, the terminal device does not perform channel detection for assessing availability of the first channel occupancy.

In an embodiment, in some embodiments of the present application,
- if the terminal device initiates the first channel occupancy, the terminal device initiates the first channel occupancy; or
- if the terminal device does not initiate the first channel occupancy, the terminal device cancels initiation of the first channel occupancy; or if the terminal device does not initiate the first channel occupancy, the terminal device does not perform channel detection for assessing availability of the first channel occupancy.

In an embodiment, in some embodiments of the present application, where the terminal device initiates the first channel occupancy may specifically be:

the terminal device performing channel detection for assessing availability of the first channel occupancy.

For example, the terminal device performs the channel detection during an idle period of a previous channel occupancy of the first channel occupancy, and if the result of the channel detection is idle, the terminal device determines that the first COT is available, which is also referred to as the terminal device obtaining the first channel occupancy; if a result of the channel detection is busy, the terminal device determines that the first COT is not available.

In an embodiment, where the terminal device performs channel detection for assessing availability of the first channel occupancy includes: the terminal device performs an energy detection for a period of 9 microseconds prior to the first channel occupancy, to assess the availability of the first COT in the first channel occupancy.

In an embodiment, in some embodiments of the present application, if the terminal device initiates the first channel occupancy, the terminal device may share an obtained resource in a first COT in the first channel occupancy with the network device.

Therefore, in the embodiments of the present application, after determining the first channel occupancy in the first periodic channel occupancy, the terminal device may initiate the first channel occupancy or not initiate the first channel occupancy, so that the COT initiated by the network device and the COT initiated by the terminal device can be prevented from colliding on the unlicensed spectrum, that is to say, the COT initiated by the network device and the COT initiated by the terminal device can reasonably coexist on the unlicensed spectrum, thereby improving the communication performance.

The schemes in the present application are described in detail though the following Embodiment 1 and Embodiment 2.

Figure 6:
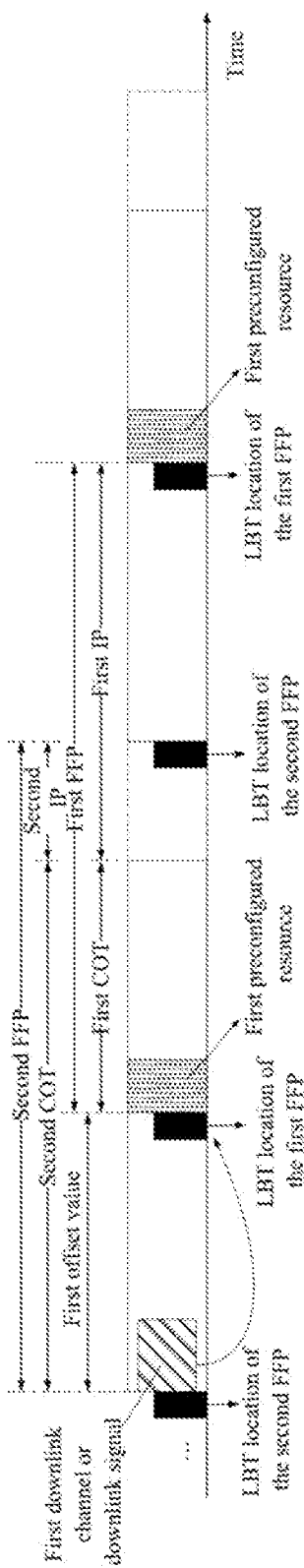
FIG. 6 is a schematic diagram of a channel occupancy according to an embodiment of the present application.

In Embodiment 1, as shown in FIG. 6, a terminal device determines a first FFP and a second FFP, the first FFP is used for the terminal device to initiate a channel occupancy, where the first FFP includes a first COT and a first IP, and the second FFP is used for a network device to initiate a channel occupancy, where the second FFP includes a second COT and a second IP. A frequency domain resource corresponding to the first FFP and a frequency domain resource corresponding to the second FFP are fully overlapped in the frequency domain. An FFP corresponding to the first FFP and an FFP corresponding to the second FFP have the same FFP length, and a first offset value between the FFP corresponding to the first FFP and the FFP corresponding to the second FFP is a positive offset value. A time domain resource occupied by the second COT includes a time domain resource occupied by the first COT, and a time domain resource occupied by the first IP includes a time domain resource occupied by the second IP.

In Embodiment 1, case 1: the terminal device determines to transmit a first uplink channel or uplink signal on a first preconfigured resource.

In some possible implementations, if the terminal device does not receive, within the second COT, a first downlink channel or downlink signal transmitted by the network device, or the terminal device does not receive, within the second COT, first indication information transmitted by the network device, the terminal device initiates the first COT, or, the terminal device performs channel detection at an LBT location of the first FFP. If the channel detection performed by the terminal device at the LBT location of the first FFP is successful, the terminal device transmits the first uplink channel or uplink signal via the first preconfigured resource. If the channel detection performed by the terminal device at the LBT location of the first FFP is failed, the terminal device does not transmit the first uplink channel or uplink signal via the first preconfigured resource. Further, in a case that the terminal device transmits the first uplink channel or uplink signal via the first preconfigured resource, the terminal device may also share a resource in the first COT with the network device.

In some possible implementations, if the terminal device receives, within the second COT, first indication information transmitted by the network device and the terminal device determines, according to the first indication information, that uplink transmission via the first preconfigured resource is possible, the terminal device cancels initiation of the first COT, or, the terminal device may perform the channel detection for the first preconfigured resource by sharing the second COT, and transmit the first uplink channel or uplink signal via the first preconfigured resource when the channel detection is successful, or not transmit the first uplink channel or uplink signal via the first preconfigured resource after the channel detection is failed. When the terminal device shares the COT, the channel detection method may be the same as those in the prior art, which will not be repeated here.

In some possible implementations, if the terminal device receives, within the second COT, first indication information transmitted by the network device and the terminal device determines, according to the first indication information, that the uplink transmission via the first preconfigured resource is not possible, the terminal device cancels initiation of the first COT, or, the terminal device does not transmit the first uplink channel or uplink signal via the first preconfigured resource. Accordingly, the terminal device also does not perform the channel detection for the first preconfigured resource.

In Embodiment 1, case 2: the terminal device determines that there is no unicast data, for example no unicast PUSCH, to be transmitted on the first preconfigured resource.

In some possible implementations, if the terminal device does not receive, within the second COT, a first downlink channel or downlink signal transmitted by the network device, or the terminal device does not receive, within the second COT, first indication information transmitted by the network device, the terminal device initiates the first COT, or, in other words, the terminal device performs channel detection at the LBT location of the first FFP. If the channel detection performed by the terminal device at the LBT location of the first FFP is successful, the terminal device transmits a first message via the first preconfigured resource, where the first message is used to instruct the terminal device to share the resource in the first COT with the network device. If the channel detection performed by the terminal device at the LBT location of the first FFP is failed, the terminal device does not transmit the first information via the first preconfigured resource.

In some possible implementations, if the terminal device does not receive, within the second COT, the first downlink channel or downlink signal transmitted by the network device, or the terminal device does not receive, within the second COT, the first indication information transmitted by the network device, the terminal device cancels initiation of the first COT.

In some possible implementations, if the terminal device receives, within the second COT, the first indication information transmitted by the network device and the terminal device determines, according to the first indication information, that the uplink transmission via the first preconfigured resource is possible, the terminal device cancels initiation of the first COT.

In some possible implementations, if the terminal device receives, within the second COT, the first indication information transmitted by the network device, and the terminal device determines that the uplink transmission via the first preconfigured resource is not possible according to the first indication information, the terminal device cancels initiation of the first COT.

In an embodiment, in Embodiment 1, the terminal device initiates the first COT in at least one of the following situations:
- the terminal device being configured with a COT sharing energy detection threshold (e.g. ul-toDL-COT-SharingED-Threshold-r16);
- the terminal device failing to receive a downlink transmission within the second COT;
- the terminal device receiving a DCI format which schedules a symbol included in the first uplink preconfigured resource for uplink transmission;
- a symbol included in the first uplink preconfigured resource being indicated as an uplink symbol by a higher layer parameter (e.g., tdd-UL-DL-ConfigurationCommon or tdd-UL-DL-ConfigurationDedicated);
- a symbol included in the first uplink preconfigured resource being indicated as a flexible symbol by a higher layer parameter (e.g. tdd-UL-DL-ConfigurationCommon or tdd-UL-DL-ConfigurationDedicated) and the terminal device being not configured to monitor a DCI format 2_0;
- the terminal device determining, according to the detected DCI format 2_0, that the symbol included in the first uplink preconfigured resource is indicated as an uplink symbol;
- a symbol included in the first uplink preconfigured resource being indicated as the flexible symbol by a higher layer parameter (e.g. tdd-UL-DL-ConfigurationCommon or tdd-UL-DL-ConfigurationDedicated), the terminal device being configured to monitor a DCI format 2_0, and the terminal device being configured with an enable uplink preconfigured parameter (e.g. EnableConfiguredUL-r16) and the terminal device failing to detect the DCI format 2_0.

In an embodiment, in Embodiment 1, the terminal device cancels initiation of the first COT in at least one of the following situations:
- the terminal device being not configured with a COT sharing energy detection threshold (e.g. ul-toDL-COT-SharingED-Threshold-r16):
- the terminal device receiving any downlink transmission within the second COT;
- a symbol included in the first uplink preconfigured resource being indicated as a downlink symbol by a higher layer parameter (e.g. tdd-UL-DL-ConfigurationCommon or tdd-UL-DL-ConfigurationDedicated);
- the terminal device receiving a DCI format which schedules at least one of symbols included in the first uplink preconfigured resource for downlink transmission; and
- the terminal device determining, according to a detected DCI format 2_0, that a symbol included in the first uplink preconfigured resource is indicated as a downlink symbol or a flexible symbol;
- a symbol included in the first uplink preconfigured resource being indicated as a flexible symbol by a higher layer parameter (e.g. tdd-UL-DL-ConfigurationCommon or tdd-UL-DL-ConfigurationDedicated), the terminal device being configured to monitor a DCI format 2_0, and the terminal device being not configured with an enable uplink preconfigured parameter (e.g. EnableConfiguredUL-r16) and the terminal device failing to detect the DCI format 2_0.

In Embodiment 1, if the terminal device receives, within the second COT, the downlink signal transmitted from the base station, the terminal device may transmit a CG-PUSCH via the first uplink preconfigured resource by sharing the second COT; or if the terminal device does not receive, within the second COT, the downlink signal transmitted from the base station, the terminal device may initiate the first COT and transmit the CG-PUSCH via the first uplink preconfigured resource. This configuration can provide a higher channel access probability for the uplink transmission of the terminal device, which is beneficial for supporting ultra-reliable and low latency communication (URLLC) services.

Figure 7:
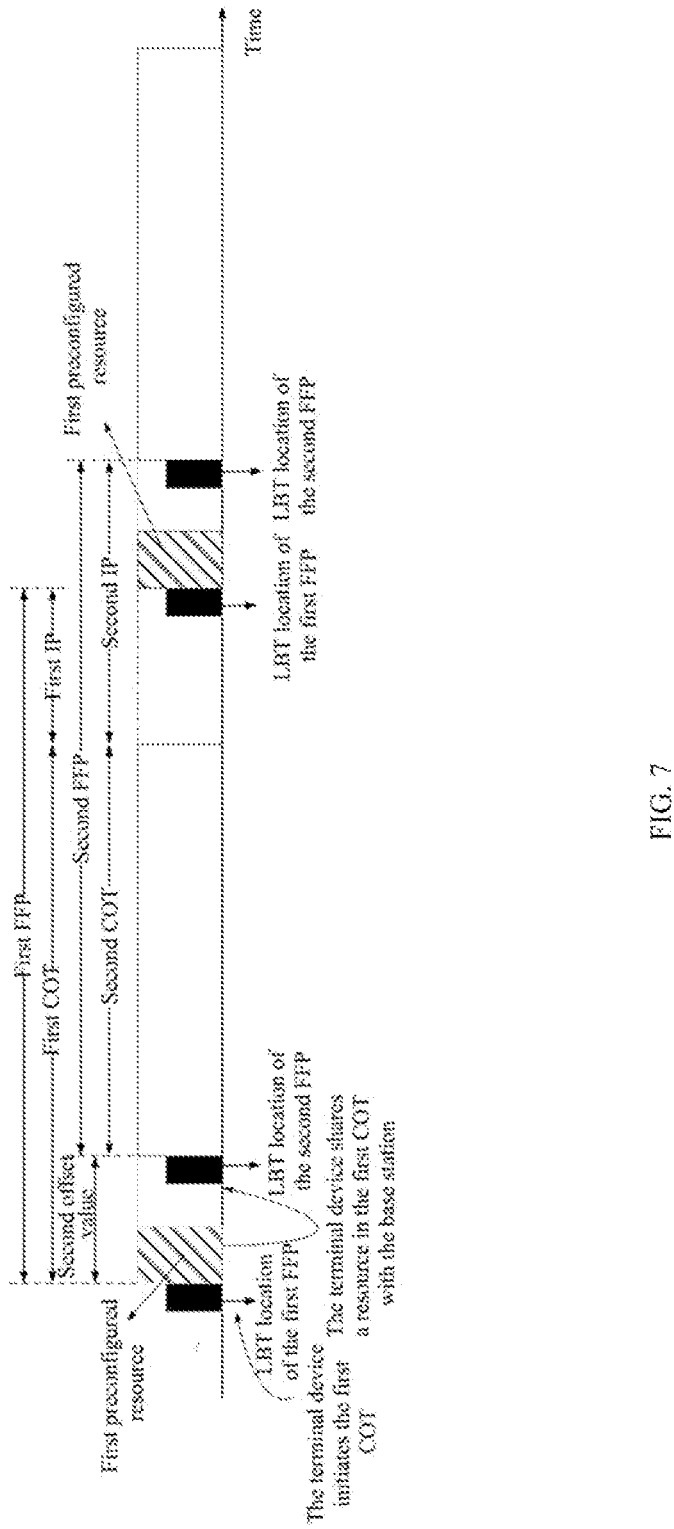
FIG. 7 is a schematic diagram of another channel occupancy according to the embodiment of the present application.

Embodiment 2, as shown in FIG. 7, the terminal device determines a first FFP and a second FFP, the first FFP is used for the terminal device to initiate a channel occupancy, where the first FFP includes a first COT and a first IP, and the second FFP is used for the network device to initiate the channel occupancy, where the second FFP includes a second COT and a second IP. A frequency domain resource corresponding to the first FFP and a frequency domain resource corresponding to the second FFP are fully overlapped in the frequency domain. An FFP corresponding to the first FFP and an FFP corresponding to the second FFP have the same FFP length, and a second offset value between the FFP corresponding to the first FFP and the FFP corresponding to the second FFP is a negative offset value. A time domain resource occupied by the first COT includes a time domain resource occupied by the second COT, and a time domain resource occupied by the second IP includes a time domain resource occupied by the first IP.

In Embodiment 2, case 1: the terminal device determines to transmit a first uplink channel or signal on a first preconfigured resource.

In some possible implementations, the terminal device initiates the first COT, or in other words, the terminal device performs channel detection at an LBT location of the first FFP. If the channel detection performed by the terminal device at the LBT location of the first FFP is successful, the terminal device transmits the first uplink channel or signal via the first preconfigured resource. Further, in a case that the terminal device transmits the first uplink channel or uplink signal via the first preconfigured resource, the terminal device may also share a resource in the first COT with the network device. Accordingly, the network device may cancel initiation of the second COT, or, the network device may perform channel detection by sharing the first COT and perform downlink transmission via the resource in the first COT or the second COT when the channel detection is successful, or not perform downlink transmission via the resource in the first COT or the second COT when the channel detection is failed. The channel detection method when the network device shares the COT may be the same as the channel detection method when the terminal device shares the COT, which will not be described here again.

In some possible implementations, the terminal device initiates the first COT, or in other words, the terminal device performs channel detection at the LBT location of the first FFP. If the channel detection performed by the terminal device at the LBT location of the first FFP is failed, the terminal device does not transmit the first uplink channel or uplink signal via the first preconfigured resource. The network device may initiate the second COT, or, the network device performs channel detection at the LBT location of the second FFP and transmits downlink via a resource in the second COT when the channel detection is successful. Further, the network device may share the resource in the second COT in the second FFP with the terminal device.

In Embodiment 2, case 2: the terminal device determines that there is no unicast data to be transmitted on the first preconfigured resource.

In some possible implementations, the terminal device initiates the first COT, or in other words, the terminal device performs channel detection at an LBT location of the first FFP. If the channel detection performed by the terminal device at the LBT location of the first FFP is successful, the terminal device transmits first information via the first preconfigured resource, where the first information is used to instruct the terminal device to share a resource in the first COT with the network device. Accordingly, the network device may cancel initiation of the second COT, or, the network device may perform channel detection by sharing the first COT and perform downlink transmission via the resource in the first COT or the second COT when the channel detection is successful, or not perform downlink transmission via the resource in the first COT or the second COT when the channel detection is failed. The channel detection method when the network device shares the COT may be the same or similar to the channel detection method when the terminal device shares the COT, so it will not be described here again.

In some possible implementations, the terminal device cancels initiation of the first COT, or, the terminal device initiates the first COT, but the channel detection performed by the terminal device at the LBT location of the first FFP is failed. The network device may initiate the second COT, or, in other words, the network device performs the channel detection at the LBT location of the second FFP and perform downlink transmission via a resource in the second COT when the channel detection is successful. Further, the network device may share the resource in the second COT in the second FFP with the terminal device.

In an embodiment, in Embodiment 2, the terminal device initiates the first COT in at least one of the following situations:
the terminal device being configured with a COT sharing energy detection threshold (e.g. ul-toDL-COT-SharingED-Threshold-r16);
the terminal device receiving a DCI format which schedules a symbol included in the first uplink preconfigured resource for uplink transmission;
a symbol included in the first uplink preconfigured resource being indicated as an uplink symbol by a higher layer parameter (e.g., tdd-UL-DL-ConfigurationCommon or tdd-UL-DLConfigurationDedicated);
a symbol included in the first uplink preconfigured resource being indicated as a flexible symbol by a higher layer parameter (e.g. tdd-UL-DL-ConfigurationCommon or tdd-UL-DL-ConfigurationDedicated) and the terminal device being not configured to monitor a DCI format 2_0;
the terminal device determining, according to the detected DCI format 2_0, that a symbol included in the first uplink preconfigured resource is indicated as an uplink symbol;
a symbol included in the first uplink preconfigured resource being indicated as a flexible symbol by a higher layer parameter (e.g. tdd-UL-DL-ConfigurationCommon or tdd-UL-DL-ConfigurationDedicated), the terminal device being configured to monitor a DCI format 2_0, and the terminal device being configured with an enable uplink preconfigured parameter (e.g. EnableConfiguredUL-r16) and the terminal device failing to detect the DCI format 2_0.

In an embodiment, in Embodiment 2, the terminal device cancels initiation of the first COT in at least one of the following situations:
the terminal device being not configured with a COT sharing energy detection threshold (e.g. ul-toDL-COT-SharingED-Threshold-r16);
a symbol included in the first uplink preconfigured resource being indicated as a downlink symbol by a higher layer parameter (e.g. tdd-UL-DL-ConfigurationCommon or tdd-UL-DL-ConfigurationDedicated);
the terminal device receiving a DCI format which schedules at least one of symbols included in the first uplink preconfigured resource for downlink transmission; and
the terminal device determining, according to a detected DCI format 2_0, that a symbol included in the first uplink preconfigured resource is indicated as a downlink symbol or a flexible symbol;
a symbol included in the first uplink preconfigured resource being indicated as a flexible symbol by a higher layer parameter (e.g. tdd-UL-DL-ConfigurationCommon or tdd-UL-DL-ConfigurationDedicated), the terminal device being configured to monitor a DCI format 2_0, and the terminal device being not configured with an enable uplink preconfigured parameter (e.g. EnableConfiguredUL-r16) and the terminal device failing to detect the DCI format 2_0.

In Embodiment 2, the terminal device initiates the first COT and may share the COT with the base station for downlink transmission before the second COT begins or at the beginning of the first COT. If the base station receives a sharing indication from the terminal device on the first preconfigured resource, the base station may perform downlink transmission via the first COT or the second COT; or if the base station does not receive the sharing indication from the terminal device on the first preconfigured resource, the base station may initiate the second COT and transmit via the second COT. This configuration may provide a higher probability of channel access for downlink transmission from the base station.

The terminal device side embodiments of the present application are described in detail above in conjunction with FIGS. 3 to 7, and the network side embodiments of the present application are described in detail below in conjunction with FIG. 8. It should be understood that the network side embodiments and the terminal device side embodiments correspond to each other, for similar descriptions, reference can be made to the terminal device side embodiments.

Figure 8:
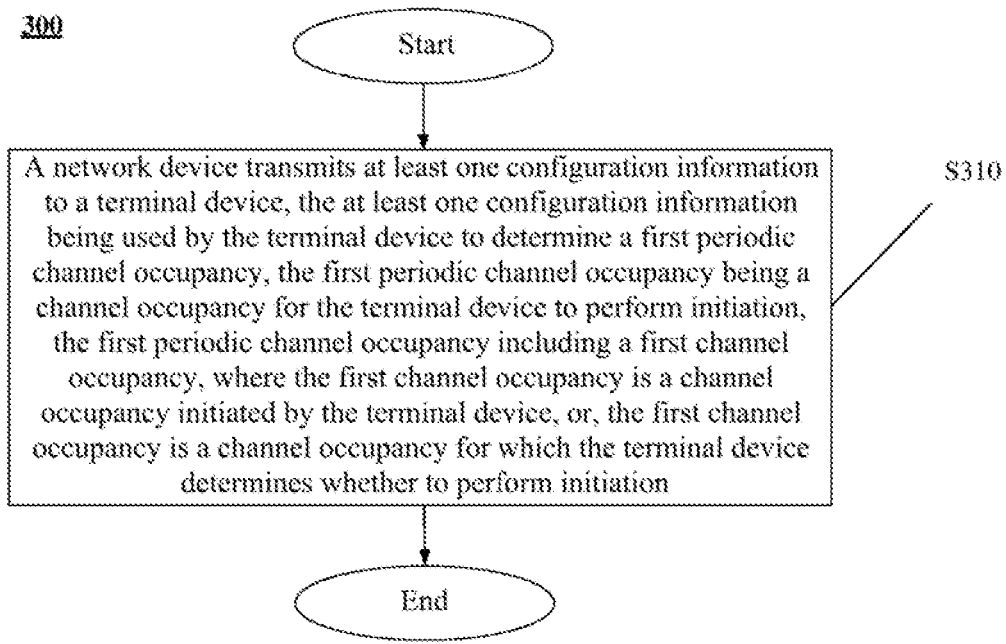
FIG. 8 is a schematic flowchart of another wireless communication method according to an embodiment of the present application.

FIG. 8 is a schematic flow diagram of a wireless communication method 300 according to the embodiments of the present application, which, as shown in FIG. 8, may include at least some of the followings:

S310, a network device transmits at least one configuration information to a terminal device, the at least one configuration information being used by the terminal device to determine a first periodic channel occupancy, the first periodic channel occupancy being a channel occupancy for the terminal device to perform initiation, the first periodic channel occupancy including a first channel occupancy, where the first channel occupancy is a channel occupancy initiated by the terminal device, or, the first channel occupancy is a channel occupancy for which the terminal device determines whether to perform initiation.

In an embodiment, the at least one configuration information includes first configuration information, where
the first configuration information is used to indicate at least one of the followings:
a length of the first periodic channel occupancy, a period of the first periodic channel occupancy, a COT length in the first periodic channel occupancy, a maximum COT length in the first periodic channel occupancy, an IP length in the first periodic channel occupancy, and a minimum IP length in the first periodic channel occupancy.

In an embodiment, the at least one configuration information includes second configuration information, where
the second configuration information is used to indicate a period of the second periodic channel occupancy or a length of the second periodic channel occupancy, a period of the first periodic channel occupancy is the same as the period of the second periodic channel occupancy, or, a length of the first periodic channel occupancy is the same as the length of the second periodic channel occupancy.

In an embodiment, an offset value between the first periodic channel occupancy and the second periodic channel occupancy is predetermined.

In an embodiment, the at least one configuration information includes third configuration information, and an offset value between the first periodic channel occupancy and the second periodic channel occupancy is determined according to the third configuration information.

In an embodiment, an offset value between the first periodic channel occupancy and the second periodic channel occupancy is a positive offset value; or
an offset value between the first periodic channel occupancy and the second periodic channel occupancy is a negative offset value; or
an offset value between the first periodic channel occupancy and the second periodic channel occupancy is 0.

In an embodiment, the second periodic channel occupancy is a channel occupancy for the network device to perform initiation, and the second periodic channel occupancy includes a second channel occupancy.

In an embodiment, a frequency domain resource corresponding to the first periodic channel occupancy and a frequency domain resource corresponding to the second periodic channel occupancy are partially overlapped in a frequency domain; or, a frequency domain resource corresponding to the first periodic channel occupancy and a frequency domain resource corresponding to the second periodic channel occupancy are fully overlapped in a frequency domain.

In an embodiment, the first periodic channel occupancy includes a first channel occupancy and the first channel occupancy includes a first COT and a first IP, and the second periodic channel occupancy includes a second channel occupancy and the second channel occupancy includes a second COT and a second IP;
a relationship of time domain locations of the first channel occupancy in the first periodic channel occupancy and the second channel occupancy in the second periodic channel occupancy includes at least one of the followings:
the second channel occupancy including the first channel occupancy;
the second COT including the first channel occupancy;
the second IP including the first channel occupancy;
the first channel occupancy including the second channel occupancy;
the first COT including the second channel occupancy;
the first IP including the second channel occupancy;
the first channel occupancy and the second channel occupancy being at least partially overlapped;
the first COT and the second COT being at least partially overlapped;
the first IP and the second IP being at least partially overlapped;
the second COT including the first COT, and the first IP including the second IP;
the first COT including the second COT, and the second IP including the first IP;
the first channel occupancy including a plurality of channel occupancies in the second periodic channel occupancy; and
the second channel occupancy including a plurality of channel occupancies in the first periodic channel occupancy.

In an embodiment, the at least one configuration information includes fourth configuration information, where
the fourth configuration information is used to indicate a period of a first uplink preconfigured resource, a period of the first periodic channel occupancy is the same as the period of the first uplink preconfigured resource.

In an embodiment, a first resource on a first time slot in the first channel occupancy is used to transmit a first uplink channel and/or uplink signal, where a starting location of the first resource is the same as a starting location of the first channel occupancy.

In an embodiment, the first resource includes a first uplink preconfigured resource; or
the first resource includes an uplink resource indicated by a first uplink grant.

In an embodiment, the first uplink channel and/or uplink signal includes at least one of the followings:
a PUCCH, a PRACH, a PUSCH, and a channel SRS.

In an embodiment, whether to share a resource in a first COT in the first channel occupancy obtained by the terminal device is determined by the network device according to the first uplink channel and/or signal received.

In an embodiment, the first periodic channel occupancy is a periodic channel occupancy corresponding to one periodic channel occupancy configured for the terminal device; or, the first periodic channel occupancy is one periodic channel occupancy of a plurality of periodic channel occupancies configured for the terminal device.

Therefore, in the embodiments of the present application, after determining the first channel first periodic channel occupancy, the terminal device may initiate the first channel occupancy or not, so that the COT initiated by the network device and the COT initiated by the terminal device can be prevented from colliding on the unlicensed spectrum, that is to say, the COT initiated by the network device and the COT initiated by the terminal device can reasonably coexist on the unlicensed spectrum, thereby improving communication performance.

Method embodiments of the present application are described in detail above in connection with FIGS. 3 to 8, and apparatus embodiments of the present application will be described in detail below in connection with FIGS. 9 to 13. It should be understood that the apparatus embodiments and the method embodiments correspond to each other, for similar descriptions, reference may be made to the method embodiments.

Figure 9:
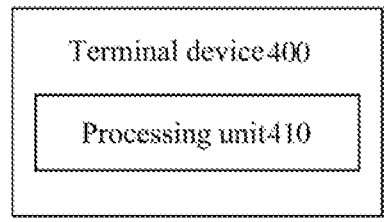
FIG. 9 is a schematic block diagram of a terminal device according to an embodiment of the present application.

FIG. 9 illustrates a schematic block diagram of a terminal device 400 according to an embodiment of the present application. As shown in FIG. 9, the terminal device 400 includes:

a processing unit 410, configured to determine a first periodic channel occupancy, the first periodic channel occupancy being a channel occupancy for the terminal device to perform initiation, and the first periodic channel occupancy including a first channel occupancy;

where the processing unit 410 is further configured to initiate the first channel occupancy, or, determine whether to initiate the first channel occupancy.

In an embodiment, the processing unit 410 is specifically configured to:

determine the first periodic channel occupancy according to first configuration information, where the first configuration information is used to indicate at least one of the followings:

a length of the first periodic channel occupancy, a period of the first periodic channel occupancy, a channel occupancy time COT length in the first periodic channel occupancy, a maximum COT length in the first periodic channel occupancy, an idle period IP length in the first periodic channel occupancy, and a minimum IP length in the first periodic channel occupancy.

In an embodiment, the processing unit 410 is specifically configured to:

determine the first periodic channel occupancy according to a second periodic channel occupancy, where a period of the first periodic channel occupancy is the same as a period of the second periodic channel occupancy, or a length of the first periodic channel occupancy is the same as a length of the second periodic channel occupancy.

In an embodiment, the processing unit 410 is specifically configured to:

determine the first periodic channel occupancy according to second configuration information, where the second configuration information is used to indicate a period of a second periodic channel occupancy or a length of the second periodic channel occupancy, a period of the first periodic channel occupancy is the same as the period of the second periodic channel occupancy, or, a length of the first periodic channel occupancy is the same as the length of the second periodic channel occupancy.

In an embodiment, an offset value between the first periodic channel occupancy and the second periodic channel occupancy is predetermined.

In an embodiment, an offset value between the first periodic channel occupancy and the second periodic channel occupancy is determined according to third configuration information.

In an embodiment, an offset value between the first periodic channel occupancy and the second periodic channel occupancy is a positive offset value; or an offset value between the first periodic channel occupancy and the second periodic channel occupancy is a negative offset value; or an offset value between the first periodic channel occupancy and the second periodic channel occupancy is 0.

In an embodiment, the second periodic channel occupancy is a channel occupancy for a network device to perform initiation, and the second periodic channel occupancy includes a second channel occupancy.

In an embodiment, a frequency domain resource corresponding to the first periodic channel occupancy and a frequency domain resource corresponding to the second periodic channel occupancy are partially overlapped in a frequency domain; or, a frequency domain resource corresponding to the first periodic channel occupancy and a frequency domain resource corresponding to the second periodic channel occupancy are fully overlapped in a frequency domain.

In an embodiment, the first channel occupancy includes a first COT and a first IP, and the second periodic channel occupancy includes a second channel occupancy and the second channel occupancy includes a second COT and a second IP;

a relationship of time domain locations of the first channel occupancy in the first periodic channel occupancy and the second channel occupancy in the second periodic channel occupancy includes at least one of the followings:

the second channel occupancy including the first channel occupancy;

the second COT including the first channel occupancy;

the second IP including the first channel occupancy;

the first channel occupancy including the second channel occupancy;

the first COT including the second channel occupancy:

the first IP including the second channel occupancy;

the first channel occupancy and the second channel occupancy being at least partially overlapped;

the first COT and the second COT being at least partially overlapped;

the first IP and the second IP being at least partially overlapped;

the second COT including the first COT and the first IP including the second IP;

the first COT including the second COT, and the second IP including the first IP;

the first channel occupancy including a plurality of channel occupancies in the second periodic channel occupancy; and the second channel occupancy including a plurality of channel occupancies in the first periodic channel occupancy.

In an embodiment, the processing unit 410 is specifically configured to:

determine the first periodic channel occupancy according to fourth configuration information, where the fourth configuration information is used to indicate a period of a first uplink preconfigured resource, a period of the first periodic channel occupancy is the same as the period of the first uplink preconfigured resource.

In an embodiment, a first resource on a first time slot in the first channel occupancy is used to transmit a first uplink channel and/or uplink signal, where a starting location of the first resource is the same as a starting location of the first channel occupancy.

In an embodiment, the first resource includes a first uplink preconfigured resource; or the first resource includes an uplink resource indicated by a first uplink grant.

In an embodiment, the first uplink channel and/or uplink signal includes at least one of the followings:
  a physical uplink control channel PUCCH, a physical random access channel PRACH, a physical uplink shared channel PUSCH, and a sounding reference signal SRS.

In an embodiment, where the processing unit 410 determines whether to initiate the first channel occupancy includes one of the followings:
  the processing unit 410 always determining to initiate the first channel occupancy;
  the processing unit 410 determining whether to initiate the first channel occupancy according to a first condition;
  if the terminal device is configured with a COT sharing energy detection threshold, the processing unit 410 determining to initiate the first channel occupancy;
  if the terminal device is not configured with the COT sharing energy detection threshold, the processing unit 410 determining not to initiate the first channel occupancy; and
  if the terminal device is configured with the COT sharing energy detection threshold, the processing unit 410 determining whether to initiate the first channel occupancy according to the first condition; and
  if the terminal device is not configured with the COT sharing energy detection threshold, the processing unit 410 determining whether to initiate the first channel occupancy according to the first condition.

In an embodiment, where the processing unit 410 determines whether to initiate the first channel occupancy according to the first condition includes one of the followings:
  if the terminal device receives a first downlink channel and/or downlink signal transmitted by a network device, the processing unit 410 determining not to initiate the first channel occupancy;
  if the terminal device fails to receive a first downlink channel and/or downlink signal transmitted by the network device, the processing unit 410 determining to initiate the first channel occupancy;
  if the terminal device determines that a first resource on a first time slot in the first channel occupancy is not available for transmission of a first uplink channel and/or uplink signal, the processing unit 410 determining not to initiate the first channel occupancy;
  if the terminal device determines that a first resource on a first time slot in the first channel occupancy is available for transmission of a first uplink channel and/or uplink signal, the processing unit 410 determining to initiate the first channel occupancy.

In an embodiment, a first resource on a first time slot in the first channel occupancy includes a first uplink preconfigured resource, where the processing unit 410 determines whether to initiate the first channel occupancy according to the first condition includes one of the followings:
  in a case that there is no uplink channel or uplink signal to be transmitted on the first uplink preconfigured resource, the processing unit 410 determining not to initiate the first channel occupancy;
  in a case that there is no uplink channel or uplink signal to be transmitted on the first uplink preconfigured resource, if the terminal device fails to receive a first downlink channel and/or downlink signal transmitted by a network device, the processing unit 410 determining to initiate the first channel occupancy;
  in a case that there is no uplink channel or uplink signal to be transmitted on the first uplink preconfigured resource, if the terminal device determines that the first resource on the first time slot in the first channel occupancy is available for transmission of a first uplink channel and/or uplink signal, the processing unit 410 determining to initiate the first channel occupancy.

In an embodiment, where the terminal device determines that the first resource on the first time slot in the first channel occupancy is not available for transmission of the first uplink channel and/or uplink signal includes at least one of the followings:
  the terminal device determining, according to first indication information transmitted by the network device, that the first resource on the first time slot in the first channel occupancy is not available for transmission of the first uplink channel and/or uplink signal;
  a symbol included in the first resource being indicated as a downlink symbol;
  the terminal device determining, according to a first downlink control information DCI format transmitted by the network device, that at least one of symbols included in the first resource is used for transmission of a downlink channel and/or downlink signal;
  the first resource including a first uplink preconfigured resource, the terminal device determining, according to a detected DCI format 2_0, that a symbol included in the first uplink preconfigured resource is indicated as a downlink symbol or a flexible symbol;
  the first resource including a first uplink preconfigured resource, a symbol included in the first uplink preconfigured resource being indicated as a flexible symbol, the terminal device being configured to monitor a DCI format 2_0, and the terminal device being not configured with an enable uplink preconfigured parameter and the terminal device failing to detect the DCI format 2_0.

In an embodiment, where the terminal device determines that the first resource on the first time slot in the first channel occupancy is available for transmission of the first uplink channel and/or uplink signal includes at least one of the followings:
  the terminal device determining, according to first indication information transmitted by the network device, that the first resource on the first time slot in the first channel occupancy is available for transmission of the first uplink channel and/or uplink signal;
  the terminal device determining, according to a first uplink grant transmitted by the network device, that the first resource on the first time slot in the first channel occupancy is available for transmission of the first uplink channel and/or uplink signal, where the first uplink grant includes one of an uplink grant DCI format, a random access response uplink grant, a fallback random access response uplink grant, and a success random access response;
  the symbol included in the first resource being indicated as an uplink symbol;
  the first resource including a first uplink preconfigured resource, and a symbol included in the first uplink preconfigured resource being indicated as a flexible symbol and the terminal device being not configured to monitor a DCI format 2_0;
  the first resource including a first uplink preconfigured resource, the terminal device determining, according to a detected DCI format 2_0, that a symbol included in the first uplink preconfigured resource is indicated as an uplink symbol;

the first resource including a first uplink preconfigured resource, a symbol included in the first uplink preconfigured resource being indicated as a flexible symbol, the terminal device being configured to monitor a DCI format 2_0, and the terminal device being configured with an enable uplink preconfigured parameter and the terminal device failing to detect the DCI format 2_0.

In an embodiment, the first downlink channel and/or downlink signal includes at least one of the followings:

a physical downlink control channel PDCCH, a physical downlink shared channel PDSCH, a synchronization signal/physical broadcast channel SS/PBCH, a channel state information reference signal CSI-RS, a demodulation reference signal DMRS, a phase tracking reference signal PT-RS, and a tracking reference signal TRS.

In an embodiment, where the terminal device receives the first downlink channel and/or downlink signal transmitted by the network device includes: the terminal device receiving the first downlink channel and/or downlink signal transmitted by the network device within a second COT in a second channel occupancy; and/or where the terminal device fails to receive a first downlink channel and/or downlink signal transmitted by the network device includes: the terminal device failing to receive the first downlink channel and/or downlink signal transmitted by the network device within the second COT in the second channel occupancy;

where the second channel occupancy is a channel occupancy for the network device to perform initiation, a time domain resource in the second COT in the second channel occupancy includes a time domain resource in a first COT in the first channel occupancy, or, the time domain resource in the first COT includes a time domain resource in the second COT, or, the first COT and the second COT are at least partially overlapped in time domain.

In an embodiment, the processing unit 410 is further configured to:

if the terminal device determines to initiate the first channel occupancy, initiate the first channel occupancy; or if the terminal device determines not to initiate the first channel occupancy, cancelling initiation of the first channel occupancy; or if the terminal device determines not to initiate the first channel occupancy, not to perform channel detection for assessing availability of the first channel occupancy.

In an embodiment, where the terminal device initiates the first channel occupancy includes:

the terminal device performing channel detection for assessing the availability of the first channel occupancy.

In an embodiment, if the terminal device initiates the first channel occupancy, the processing unit 410 is further configured to share an obtained resource in a first COT in the first channel occupancy with the network device.

In an embodiment, the first periodic channel occupancy is a periodic channel occupancy corresponding to one periodic channel occupancy configured for the terminal device; or, the first periodic channel occupancy is one periodic channel occupancy of a plurality of periodic channel occupancies configured for the terminal device.

In an embodiment, in some embodiments, the above processing unit 410 may be one or more processors.

It should be understood that the terminal device 400 according to the embodiments of the present application may correspond to the terminal device in the method embodiments of the present application, and that the above and other operations and/or functions of the various units in the terminal device 400 are respectively intended to implement the corresponding processes of the terminal device in the method 200 shown in FIG. 3 and will not be described here for the sake of brevity.

Figure 10:
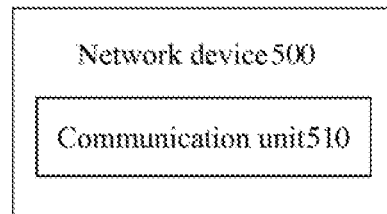
FIG. 10 is a schematic block diagram of a network device according to an embodiment of the present application.

FIG. 10 illustrates a schematic block diagram of a network device 500 according to an embodiment of the present application. As shown in FIG. 10, the network device 500 includes:

a communication unit 510, configured to transmit at least one configuration information to a terminal device, the at least one configuration information being used by the terminal device to determine a first periodic channel occupancy, the first periodic channel occupancy being a channel occupancy for the terminal device to perform initiation, the first periodic channel occupancy including a first channel occupancy, where the first channel occupancy is a channel occupancy initiated by the terminal device, or, the first channel occupancy is a channel occupancy for which the terminal device determines whether to perform initiation.

In an embodiment, the at least one configuration information includes first configuration information, where the first configuration information is used to indicate at least one of the followings:

a length of the first periodic channel occupancy, a period of the first periodic channel occupancy, a channel occupancy time COT length in the first periodic channel occupancy, a maximum COT length in the first periodic channel occupancy, an idle period IP length in the first periodic channel occupancy, and a minimum IP length in the first periodic channel occupancy.

In an embodiment, the at least one configuration information includes second configuration information, where the second configuration information is used to indicate a period of a second periodic channel occupancy or a length of the second periodic channel occupancy, a period of the first periodic channel occupancy is the same as the period of the second periodic channel occupancy, or, a length of the first periodic channel occupancy is the same as the length of the second periodic channel occupancy.

In an embodiment, an offset value between the first periodic channel occupancy and the second periodic channel occupancy is predetermined.

In an embodiment, the at least one configuration information includes third configuration information, and an offset value between the first periodic channel occupancy and the second periodic channel occupancy is determined according to the third configuration information.

In an embodiment, an offset value between the first periodic channel occupancy and the second periodic channel occupancy is a positive offset value; or an offset value between the first periodic channel occupancy and the second periodic channel occupancy is a negative offset value; or an offset value between the first periodic channel occupancy and the second periodic channel occupancy is 0.

In an embodiment, the second periodic channel occupancy is a channel occupancy for a network device to perform initiation, and the second periodic channel occupancy includes a second channel occupancy.

In an embodiment, a frequency domain resource corresponding to the first periodic channel occupancy and a frequency domain resource corresponding to the second periodic channel occupancy are partially overlapped in a frequency domain; or,
  a frequency domain resource corresponding to the first periodic channel occupancy and a frequency domain resource corresponding to the second periodic channel occupancy are fully overlapped in a frequency domain.

In an embodiment, the first periodic channel occupancy includes the first channel occupancy and the first channel occupancy includes a first COT and a first IP, and the second periodic channel occupancy includes a second channel occupancy and the second channel occupancy includes a second COT and a second IP;
  a relationship of time domain locations of the first channel occupancy in the first periodic channel occupancy and the second channel occupancy in the second periodic channel occupancy includes at least one of the followings:
  the second channel occupancy including the first channel occupancy;
  the second COT including the first channel occupancy;
  the second IP including the first channel occupancy;
  the first channel occupancy including the second channel occupancy;
  the first COT including the second channel occupancy;
  the first IP including the second channel occupancy;
  the first channel occupancy and the second channel occupancy being at least partially overlapped;
  the first COT and the second COT being at least partially overlapped;
  the first IP and the second IP being at least partially overlapped;
  the second COT including the first COT and the first IP including the second IP;
  the first COT including the second COT, and the second IP including the first IP;
  the first channel occupancy including a plurality of channel occupancies in the second periodic channel occupancy; and
  the second channel occupancy including a plurality of channel occupancies in the first periodic channel occupancy.

In an embodiment, the at least one configuration information includes fourth configuration information, where
  the fourth configuration information is used to indicate a period of a first uplink preconfigured resource, a period of the first periodic channel occupancy is the same as the period of the first uplink preconfigured resource.

In an embodiment, a first resource on a first time slot in the first channel occupancy is used to transmit a first uplink channel and/or uplink signal, where a starting location of the first resource is the same as a starting location of the first channel occupancy.

In an embodiment, the first resource includes a first uplink preconfigured resource; or
  the first resource includes an uplink resource indicated by a first uplink grant.

In an embodiment, the first uplink channel and/or uplink signal includes at least one of the followings:
  a physical uplink control channel PUCCH, a physical random access channel PRACH, a physical uplink shared channel PUSCH, and a sounding reference signal SRS.

In an embodiment, whether to share a resource in a first COT in the first channel occupancy obtained by the terminal device is determined by the network device according to the first uplink channel and/or signal received.

In an embodiment, the first periodic channel occupancy is a periodic channel occupancy corresponding to one periodic channel occupancy configured for the terminal device; or, the first periodic channel occupancy is one periodic channel occupancy of a plurality of periodic channel occupancies configured for the terminal device.

In an embodiment, in some embodiments, the above communication unit 510 may be a communication interface or a transceiver, or an input/output interface of a communication chip or a system-on-chip.

It should be understood that the network device 500 according to the embodiments of the present application may correspond to the network device in the method embodiments of the present application, and that the above and other operations and/or functions of the individual units in the network device 500 are respectively intended to implement the corresponding processes of the network device in the method 300 shown in FIG. 8, and will not be described here for the sake of brevity.

Figure 11:
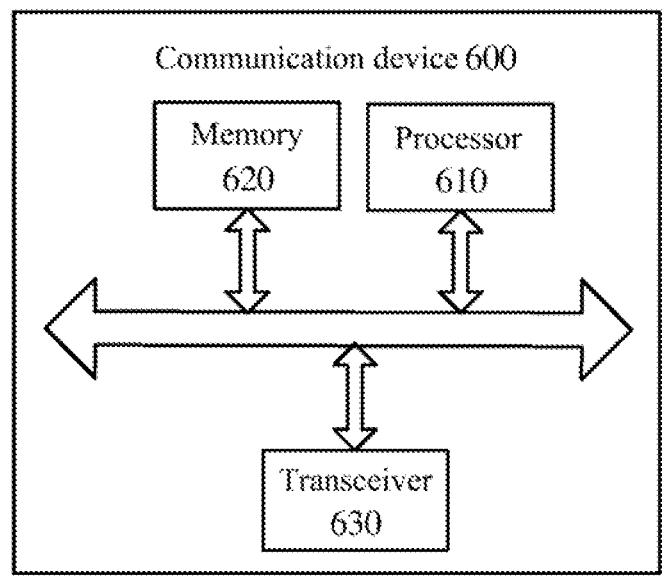
FIG. 11 is a schematic block diagram of a communication device according to an embodiment of the present application.

FIG. 11 is a schematic structural diagram of a communication device 600 provided by an embodiment of the present application. The communication device 600 shown in FIG. 11 includes a processor 610 which can call and run a computer program from a memory to implement the methods in the embodiments of the present application.

In an embodiment, as shown in FIG. 11, the communication device 600 may further include a memory 620. The processor 610 may call and run a computer program from the memory 620 to implement the methods in the embodiments of the present application.

Where the memory 620 may be a device separate from the processor 610 or may be integrated into the processor 610.

In an embodiment, as shown in FIG. 11, the communication device 600 may further include a transceiver 630, the processor 610 may control the transceiver 630 to communicate with other devices, specifically, to transmit information or data to, or receive information or data from, other devices.

Where the transceiver 630 may include a transmitter and a receiver. The transceiver 630 may further include an antenna, and the number of antennas may be one or more than one.

In an embodiment, the communication device 600 may specifically be a network device of the embodiments of the present application, and the communication device 600 may implement the corresponding processes implemented by the network device in various methods of the embodiments of the present application, which will not be described here for the sake of brevity.

In an embodiment, the communication device 600 may be specifically a mobile terminal/terminal device of the embodiments of the present application, and the communication device 600 may implement the corresponding processes implemented by the mobile terminal/terminal device in various methods of the embodiments of the present application, which will not be described here for the sake of brevity.

Figure 12:
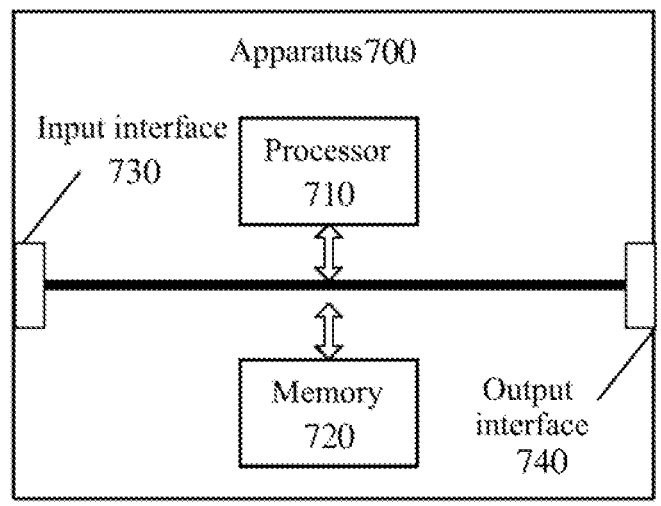
FIG. 12 is a schematic block diagram of an apparatus according to an embodiment of the present application.

FIG. 12 is a schematic structural diagram of an apparatus of an embodiment of the present application. The apparatus 700 shown in FIG. 12 includes a processor 710, where the processor 710 may call and run a computer program from a memory to implement the methods in the embodiments of the present application.

In an embodiment, as shown in FIG. 12, the apparatus 700 may further include a memory 720. The processor 710 may call and run a computer program from the memory 720 to implement the methods in the embodiments of the present application.

Where the memory 720 may be a device separate from the processor 710 or may be integrated in the processor 710.

In an embodiment, the apparatus 700 may further include an input interface 730, where the processor 710 may control the input interface 730 to communicate with other devices or chips, specifically, to obtain information or data transmitted by other devices or chips.

In an embodiment, the apparatus 700 may also include an output interface 740, where the processor 710 may control the output interface 740 to communicate with other devices or chips, specifically, to output information or data to other devices or chips.

In an embodiment, the apparatus may be applied to the network device in the embodiments of the present application, and the apparatus may implement the corresponding processes implemented by the network device in various methods of the embodiments of the present application, which will not be described here for the sake of brevity.

In an embodiment, the apparatus may be applied to the mobile terminal/terminal device in the embodiments of the present application, and the apparatus can implement the corresponding process implemented by the mobile terminal/terminal device in various methods of the embodiments of the present application, which will not be described here for the sake of brevity.

In an embodiment, the apparatus mentioned in the embodiment of the present application may also be a chip. For example, it can be a system level chip, a system chip, a chip system or a system-on-a-chip, etc.

Figure 13:
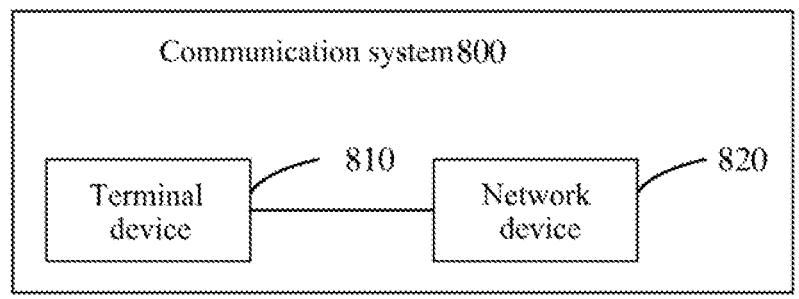
FIG. 13 is a schematic block diagram of a communication system according to an embodiment of the present application.

FIG. 13 is a schematic block diagram of a communication system 800 provided by an embodiment of the present application. As shown in FIG. 13, the communication system 800 includes a terminal device 810 and a network device 820.

Where the terminal device 810 may be configured to implement the corresponding functions implemented by the terminal device in the methods described above, and the network device 820 may be configured to implement the corresponding functions implemented by the network device in the methods described above, and description will be omitted here for the sake of brevity.

It should be understood that the processor of the embodiments of the present application may be an integrated circuit chip having a capability for processing a signal. In the process of implementation, the steps of the above methods embodiment may be accomplished by integrated logic circuits in the hardware of the processor or instructions in the form of software. The above processor may be a general purpose processor, a digital signal processor (DSP), an application specific integrated circuit (ASIC), a field programmable gate array (FPGA) or other programmable logic device, a discrete gate or a transistor logic device, or a discrete hardware component. The methods, steps, and logical block diagrams disclosed in the embodiments of the present application may be implemented or performed. The general purpose processor may be a microprocessor or the processor may also be any conventional processor, etc. The steps of the methods disclosed in combination with the embodiments of the present application can be directly embodied as being performed by a hardware coding processor, or being performed by a combination of hardware and software modules in the coding processor. The software module can be located in a storage medium well established in the art, such as a random memory, a flash memory, a read-only memory, a programmable read-only memory or an electrically erasable programmable memory, a register, and other storage mediums. The storage medium is located in a memory and the processor reads information in the memory and completes the steps of the above method in combination with its hardware.

It is understood that the memory in the embodiments of the present application may be a volatile memory or a non-volatile memory, or may include both the volatile and the non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), which is used as an external cache. By way of illustration, but not limitation, RAM of many forms are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). It should be noted that the memories of the systems and methods described herein are intended to include, but are not limited to, these and any other suitable types of memories.

It should be understood that the above memories are illustrative but not restrictive, for example, the memories in the embodiments of the present application may also be a static random RAM (static RAM, SRAM), a dynamic RAM (dynamic RAM, DRAM), a synchronous DRAM (SDRAM), a double data rate SDRAM (DDR SDRAM), an enhanced SDRAM (enhanced SDRAM, ESDRAM), a synchronous link DRAM (synch link DRAM, SLDRAM), and a direct rambus RAM (Direct Rambus RAM, DRAM), and so on. That is, the memories in the embodiments of the present application are intended to include, but are not limited to, these and any other suitable types of memories.

Embodiments of the present application also provide a computer-readable storage medium for storing a computer program.

In an embodiment, the computer readable storage medium may be applied to the network device in the embodiments of the present application, and the computer program causes a computer to perform the corresponding processes implemented by the network device in various methods of the embodiments of the present application, which will not be described here for the sake of brevity.

In an embodiment, the computer readable storage medium may be applied to the mobile terminal/terminal device in the embodiments of the present application, and the computer program causes a computer to perform the corresponding processes implemented by the mobile terminal/terminal device in various methods of the embodiments of the present application, which will not be described here for the sake of brevity.

Embodiments of the present application also provide a computer program product, including computer program instructions.

In an embodiment, the computer program product may be applied to the network device in the embodiments of the present application, and the computer program instructions cause a computer to perform the corresponding processes implemented by the network device in various methods of the embodiments of the present application, which will not be described here for the sake of brevity.

In an embodiment, the computer program product may be applied to the mobile terminal/terminal device in the embodiments of the present application, and the computer program instructions cause a computer to perform the corresponding processes implemented by the mobile terminal/terminal device in various methods of the embodiments of the present application, which will not be described here for the sake of brevity.

Embodiments of the present application also provide a computer program.

In an embodiment, the computer program may be applied to the network device of the embodiments of the present application, and the computer program, when running on the computer, causes a computer to perform the corresponding processes implemented by the network device in various methods of the embodiments of the present application, which will not be described here for the sake of brevity.

In an embodiment, the computer program may be applied to the mobile terminal/terminal device in the embodiments of the present application, and the computer program, when running on the computer, causes a computer to perform the corresponding processes implemented by the mobile terminal/terminal device in various methods of the embodiments of the present application, which will not be described here for the sake of brevity.

A person of ordinary skill in the art can realize that the units and algorithmic steps of each example described in conjunction with the embodiments disclosed herein can be implemented by an electronic hardware, or a combination of computer software and electronic hardware. Whether these functions are performed in hardware or software depends on a particular application and a design constraint of the technical scheme. The skilled person may use different methods to implement the described functions for each particular application, but such implementation should not be considered as being beyond the scope of the present application.

It will be clear to those skilled in the field that, for the convenience and brevity of the description, reference can be made to the corresponding processes in the preceding method embodiments for the specific working processes of the systems, apparatuses and units described above, which will not be repeated here.

In the several embodiments provided in the present application, it should be understood that the disclosed systems, apparatuses and methods, can be implemented in other ways. For example, the embodiments of the apparatuses described above are merely schematic, for example, the division of the units described, which is only a logical functional division, can be implemented in practice in another way, and for example, multiple units or components can be combined or can be integrated into another system, or some features can be ignored, or not implemented. On another point, the mutual coupling or direct coupling or communication connections shown or discussed may be indirect coupling or communication connections of devices or units through some interface, which may be in electrical, mechanical or other forms.

The units illustrated as separate components may or may not be physically separated, and the components shown as units may or may not be physical units, i.e., they may be located in one place or may be distributed to a plurality of network units. Some or all of these units can be selected according to practical needs to achieve the purpose of the present embodiment solution.

In addition, various functional units in various embodiments of the present application may be integrated in a single processing unit, or each unit may physically exist separately, or two or more units may be integrated in a single unit.

The functions may be stored in a computer readable storage medium if implemented as a software functional unit and sold or used as a separate product. It is understood that the technical scheme of the present application or a part of the technical scheme that essentially contributes to the prior art, or a part of the technical scheme, may be embodied in the form of a software product that is stored in a storage medium and includes a number of instructions to cause a computer device (which may be a personal computer, a server, or a network device, etc.) to perform all or some of the steps of the methods described in various embodiments of the present application.

The aforementioned storage medium includes: a USB flash drive, a removable hard disk, a read-only memory (ROM), a random access memory (RAM), a disk or an optical disc, and other mediums that can store a program code.

The above mentioned is only specific implementations of the present application, but the scope of protection of the present application is not limited thereto, and any person skilled in the art can easily think of variations or substitutions within the technical scope disclosed in the present application, which should be covered by the scope of protection of the present application. Therefore, the scope of protection of the present application shall be stated to be subject to the scope of protection of the claims.

What is claimed is:

1. A wireless communication method, comprising:
   determining, by a terminal device, a first periodic channel occupancy, the first periodic channel occupancy being a channel occupancy for the terminal device to perform initiation, and the first periodic channel occupancy comprising a first channel occupancy;
   determining, by the terminal device, whether to initiate the first channel occupancy;
   wherein the determining, by the terminal device, whether to initiate the first channel occupancy comprises one of the followings:
   always determining, by the terminal device, to initiate the first channel occupancy;
   determining, by the terminal device, whether to initiate the first channel occupancy according to a first condition;
   if the terminal device is configured with a channel occupancy time (COT) sharing energy detection threshold, determining, by the terminal device, to initiate the first channel occupancy;
   if the terminal device is not configured with the COT sharing energy detection threshold, determining, by the terminal device, not to initiate the first channel occupancy;
   if the terminal device is configured with the COT sharing energy detection threshold, determining, by the terminal device, whether to initiate the first channel occupancy according to the first condition; and
   if the terminal device is not configured with the COT sharing energy detection threshold, determining, by the terminal device, whether to initiate the first channel occupancy according to the first condition;
   wherein the determining, by the terminal device, whether to initiate the first channel occupancy according to the first condition comprises one of the followings:
   if the terminal device receives a first downlink channel and/or downlink signal transmitted by a network device, determining, by the terminal device, not to initiate the first channel occupancy;
if the terminal device fails to receive a first downlink channel and/or downlink signal transmitted by the network device, determining, by the terminal device, to initiate the first channel occupancy;
if the terminal device determines that a first resource on a first time slot in the first channel occupancy is not available for transmission of a first uplink channel and/or uplink signal, determining, by the terminal device, not to initiate the first channel occupancy;
if the terminal device determines that a first resource on a first time slot in the first channel occupancy is available for transmission of a first uplink channel and/or uplink signal, determining, by the terminal device, to initiate the first channel occupancy;
wherein the terminal device receives the first downlink channel and/or downlink signal transmitted by the network device comprises: receiving, by the terminal device, the first downlink channel and/or downlink signal transmitted by the network device within a second COT in a second channel occupancy; and/or
wherein the terminal device fails to receive the first downlink channel and/or downlink signal transmitted by the network device comprises: failing, by the terminal device, to receive the first downlink channel and/or downlink signal transmitted by the network device within the second COT in the second channel occupancy;
wherein the second channel occupancy is a channel occupancy for the network device to perform initiation, a time domain resource in the second COT in the second channel occupancy comprises a time domain resource in a first COT in the first channel occupancy, or, the time domain resource in the first COT comprises a time domain resource in the second COT, or, the first COT and the second COT are at least partially overlapped in the time domain;
wherein the determining, by the terminal device the first periodic channel occupancy comprises:
determining, by the terminal device, the first periodic channel occupancy according to a second periodic channel occupancy,
wherein a period of the first periodic channel occupancy is the same as a period of the second periodic channel occupancy, or, a length of the first periodic channel occupancy is the same as a length of the second periodic channel occupancy;
wherein the second periodic channel occupancy is a channel occupancy for a network device to perform initiation.

2. The method according to claim 1, wherein the second periodic channel occupancy comprises the second channel occupancy.

3. The method according to claim 1, wherein the first channel occupancy comprises a first COT and a first IP, and the second periodic channel occupancy comprises a second channel occupancy and the second channel occupancy comprises a second COT and a second IP; and
a relationship of time domain locations of the first channel occupancy in the first periodic channel occupancy and the second channel occupancy in the second periodic channel occupancy comprises at least one of the followings:
the second channel occupancy comprising the first channel occupancy;
the second COT comprising the first channel occupancy;
the second IP comprising the first channel occupancy;
the first channel occupancy comprising the second channel occupancy;
the first COT comprising the second channel occupancy;
the first IP comprising the second channel occupancy;
the first channel occupancy and the second channel occupancy being at least partially overlapped;
the first COT and the second COT being at least partially overlapped;
the first IP and the second IP being at least partially overlapped;
the second COT comprising the first COT, and the first IP comprising the second IP;
the first COT comprising the second COT, and the second IP comprising the first IP;
the first channel occupancy comprising a plurality of channel occupancies in the second periodic channel occupancy;
the second channel occupancy comprising a plurality of channel occupancies in the first periodic channel occupancy.

4. The method according to claim 1, wherein
a first resource on a first time slot in the first channel occupancy is used to transmit a first uplink channel and/or uplink signal, wherein a starting location of the first resource is the same as a starting location of the first channel occupancy.

5. A non-transitory computer readable storage medium having stored thereon a computer program that causes a computer to perform the method according to claim 1.

6. A wireless communication method, comprising:
transmitting, by a network device, at least one configuration information to a terminal device, the at least one configuration information being used by the terminal device to determine a first periodic channel occupancy, the first periodic channel occupancy being a channel occupancy for the terminal device to perform initiation, the first periodic channel occupancy comprising a first channel occupancy, wherein the first channel occupancy is a channel occupancy for which the terminal device determines whether to perform initiation;
wherein the first channel occupancy is the channel occupancy for which the terminal device determines whether to perform initiation comprises one of the followings:
the first channel occupancy is the channel occupancy for which the terminal device always determines to perform initiation;
the first channel occupancy is the channel occupancy for which the terminal device determines whether to perform initiation according to a first condition;
if the terminal device is configured with a channel occupancy time (COT) sharing energy detection threshold, the first channel occupancy is the channel occupancy for which the terminal device determines to perform initiation;
if the terminal device is not configured with the COT sharing energy detection threshold, the first channel occupancy is the channel occupancy for which the terminal device determines not to perform initiation;
if the terminal device is configured with the COT sharing energy detection threshold, the first channel occupancy is the channel occupancy for which the terminal device determines whether to perform initiation according to the first condition; and
if the terminal device is not configured with the COT sharing energy detection threshold, the first channel occupancy is the channel occupancy for which the terminal device determines whether to perform initiation according to the first condition;

wherein the first channel occupancy is the channel occupancy for which the terminal device determines whether to perform initiation according to the first condition comprises one of the followings:

if the terminal device is configured to receive a first downlink channel and/or downlink signal transmitted by a network device, the first channel occupancy is the channel occupancy for which the terminal device determines not to perform initiation;

if the terminal device is configured to fail to receive a first downlink channel and/or downlink signal transmitted by the network device, the first channel occupancy is the channel occupancy for which the terminal device determines to perform initiation;

if the terminal device is configured to determine that a first resource on a first time slot in the first channel occupancy is not available for transmission of a first uplink channel and/or uplink signal, the first channel occupancy is the channel occupancy for which the terminal device determines not to perform initiation;

if the terminal device is configured to determine that a first resource on a first time slot in the first channel occupancy is available for transmission of a first uplink channel and/or uplink signal, the first channel occupancy is the channel occupancy for which the terminal device determines to perform initiation;

wherein the terminal device is configured to receive the first downlink channel and/or downlink signal transmitted by the network device comprises: the terminal device is configured to receive the first downlink channel and/or downlink signal transmitted by the network device within a second COT in a second channel occupancy; and/or wherein the terminal device is configured to fail to receive the first downlink channel and/or downlink signal transmitted by the network device comprises: the terminal device is configured to fail to receive the first downlink channel and/or downlink signal transmitted by the network device within the second COT in the second channel occupancy;

wherein the second channel occupancy is a channel occupancy for the network device to perform initiation, a time domain resource in the second COT in the second channel occupancy comprises a time domain resource in a first COT in the first channel occupancy, or, the time domain resource in the first COT comprises a time domain resource in the second COT, or, the first COT and the second COT are at least partially overlapped in the time domain;

wherein the terminal device is configured to determine a first periodic channel occupancy comprises:

the terminal device is configured to determine the first periodic channel occupancy according to a second periodic channel occupancy, wherein a period of the first periodic channel occupancy is the same as a period of the second periodic channel occupancy, or, a length of the first periodic channel occupancy is the same as a length of the second periodic channel occupancy:

wherein the second periodic channel occupancy is a channel occupancy for a network device to perform initiation.

7. The method according to claim 6, wherein the second periodic channel occupancy comprises the second channel occupancy.

8. The method according to claim 6, wherein
a frequency domain resource corresponding to the first periodic channel occupancy and a frequency domain resource corresponding to the second periodic channel occupancy are partially overlapped in a frequency domain; or
a frequency domain resource corresponding to the first periodic channel occupancy and a frequency domain resource corresponding to the second periodic channel occupancy are fully overlapped in a frequency domain.

9. The method according to claim 6, wherein the first channel occupancy comprises a first COT and a first IP, and the second periodic channel occupancy comprises a second channel occupancy and the second channel occupancy comprises a second COT and a second IP;
a relationship of time domain locations of the first channel occupancy in the first periodic channel occupancy and the second channel occupancy in the second periodic channel occupancy comprises at least one of the followings:
the second channel occupancy comprising the first channel occupancy;
the second COT comprising the first channel occupancy;
the second IP comprising the first channel occupancy;
the first channel occupancy comprising the second channel occupancy;
the first COT comprising the second channel occupancy;
the first IP comprising the second channel occupancy;
the first channel occupancy and the second channel occupancy being at least partially overlapped;
the first COT and the second COT being at least partially overlapped;
the first IP and the second IP being at least partially overlapped;
the second COT comprising the first COT, and the first IP comprising the second IP;
the first COT comprising the second COT, and the second IP comprising the first IP;
the first channel occupancy comprising a plurality of channel occupancies in the second periodic channel occupancy;
the second channel occupancy comprising a plurality of channel occupancies in the first periodic channel occupancy.

10. The method according to claim 6, wherein
a first resource on a first time slot in the first channel occupancy is used to transmit a first uplink channel and/or uplink signal, wherein a starting location of the first resource is the same as a starting location of the first channel occupancy.

11. A network device, comprising:
a processor and a memory for storing a computer program, the processor is configured to call and run the computer program stored in the memory to perform the method according to claim 6.

12. A non-transitory computer readable storage medium having stored thereon a computer program that causes a computer to perform the method according to claim 6.

13. A terminal device, comprising: a processor and a memory for storing a computer program, the processor being configured to call and run the computer program stored in the memory to:
determine a first periodic channel occupancy, the first periodic channel occupancy being a channel occupancy for the terminal device to perform initiation, and the first periodic channel occupancy comprising a first channel occupancy; and determine whether to initiate the first channel occupancy;

wherein the determine whether to initiate the first channel occupancy comprises one of the followings:

always determine to initiate the first channel occupancy;

determine whether to initiate the first channel occupancy according to a first condition;

if the terminal device is configured with a channel occupancy time (COT) sharing energy detection threshold, determine to initiate the first channel occupancy;

if the terminal device is not configured with the COT sharing energy detection threshold, determine not to initiate the first channel occupancy;

if the terminal device is configured with the COT sharing energy detection threshold, determine whether to initiate the first channel occupancy according to the first condition; and if the terminal device is not configured with the COT sharing energy detection threshold, determine whether to initiate the first channel occupancy according to the first condition;

wherein the determine whether to initiate the first channel occupancy according to the first condition comprises one of the followings:

if the terminal device receives a first downlink channel and/or downlink signal transmitted by a network device, determine not to initiate the first channel occupancy;

if the terminal device fails to receive a first downlink channel and/or downlink signal transmitted by the network device, determine to initiate the first channel occupancy;

if the terminal device determines that a first resource on a first time slot in the first channel occupancy is not available for transmission of a first uplink channel and/or uplink signal, determine not to initiate the first channel occupancy;

if the terminal device determines that a first resource on a first time slot in the first channel occupancy is available for transmission of a first uplink channel and/or uplink signal, determine to initiate the first channel occupancy;

wherein the terminal device receives the first downlink channel and/or downlink signal transmitted by the network device comprises; receive the first downlink channel and/or downlink signal transmitted by the network device within a second COT in a second channel occupancy; and/or wherein the terminal device fails to receive the first downlink channel and/or downlink signal transmitted by the network device comprises: fail to receive the first downlink channel and/or downlink signal transmitted by the network device within the second COT in the second channel occupancy;

wherein the second channel occupancy is a channel occupancy for the network device to perform initiation, a time domain resource in the second COT in the second channel occupancy comprises a time domain resource in a first COT in the first channel occupancy, or, the time domain resource in the first COT comprises a time domain resource in the second COT, or, the first COT and the second COT are at least partially overlapped in the time domain;

wherein the determine the first periodic channel occupancy comprises:

determine the first periodic channel occupancy according to a second periodic channel occupancy, wherein a period of the first periodic channel occupancy is the same as a period of the second periodic channel occupancy, or a length of the first periodic channel occupancy is the same as a length of the second periodic channel occupancy;

wherein the second periodic channel occupancy is a channel occupancy for a network device to perform initiation.

* * * * *